US008277939B2

(12) United States Patent
Buether et al.

(10) Patent No.: US 8,277,939 B2
(45) Date of Patent: *Oct. 2, 2012

(54) GLASS SUBSTRATES COATED OR LAMINATED WITH CURED SILICONE RESIN COMPOSITIONS

(75) Inventors: John Fredrick Buether, Midland, MI (US); Dimitris Katsoulis, Midland, MI (US); Herschel Henry Reese, Midland, MI (US); Bizhong Zhu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 403 days.

This patent is subject to a terminal disclaimer.

(21) Appl. No.: 12/519,911

(22) PCT Filed: Oct. 18, 2007

(86) PCT No.: PCT/US2007/022242
§ 371 (c)(1),
(2), (4) Date: Jun. 18, 2009

(87) PCT Pub. No.: WO2008/079179
PCT Pub. Date: Jul. 3, 2008

(65) Prior Publication Data
US 2010/0015439 A1   Jan. 21, 2010

Related U.S. Application Data

(60) Provisional application No. 60/875,952, filed on Dec. 20, 2006.

(51) Int. Cl.
*B32B 17/10* (2006.01)

(52) U.S. Cl. ......... 428/337; 428/429; 428/447; 428/448

(58) Field of Classification Search .................. 428/337, 428/429, 447, 448
See application file for complete search history.

(56) References Cited

U.S. PATENT DOCUMENTS

| | | |
|---|---|---|
| 3,419,593 A | 12/1968 | Willing |
| 3,615,272 A | 10/1971 | Collins et al. |
| 3,640,837 A | 2/1972 | Gaeth et al. |
| 4,087,585 A | 5/1978 | Schulz |
| 4,260,780 A | 4/1981 | West |
| 4,276,424 A | 6/1981 | Peterson, Jr. et al. |
| 4,314,956 A | 2/1982 | Baney et al. |
| 4,324,901 A | 4/1982 | West et al. |
| 4,510,094 A | 4/1985 | Drahnak |
| 4,530,879 A | 7/1985 | Drahnak |
| 4,568,566 A | 2/1986 | Tolentino |
| 4,766,176 A | 8/1988 | Lee et al. |
| 4,841,006 A | 6/1989 | Kobayashi et al. |
| 4,999,397 A | 3/1991 | Weiss et al. |
| 5,010,159 A | 4/1991 | Bank et al. |
| 5,017,654 A | 5/1991 | Togashi et al. |
| 5,063,267 A | 11/1991 | Hanneman et al. |
| 5,112,779 A | 5/1992 | Burns et al. |
| 5,194,649 A | 3/1993 | Okawa et al. |
| 5,283,309 A | 2/1994 | Morita |
| 5,310,843 A | 5/1994 | Morita |
| 5,340,898 A | 8/1994 | Cavezzan et al. |
| 5,358,983 A | 10/1994 | Morita et al. |
| 5,468,826 A | 11/1995 | Gentle et al. |
| 5,486,588 A | 1/1996 | Morita |
| 5,496,961 A | 3/1996 | Dauth et al. |
| 5,530,075 A | 6/1996 | Morita et al. |
| 5,565,273 A | 10/1996 | Egli et al. |
| 5,716,424 A | 2/1998 | Mennig et al. |
| 5,738,976 A | 4/1998 | Okinoshima et al. |
| 5,824,761 A | 10/1998 | Bujanowski et al. |
| 5,861,467 A | 1/1999 | Bujanowski et al. |
| 5,880,194 A | 3/1999 | Alvarez et al. |
| 5,959,038 A | 9/1999 | Furukawa et al. |
| 6,004,679 A | 12/1999 | Mitchell et al. |
| 6,131,563 A | 10/2000 | Bonnetin et al. |
| 6,159,606 A | 12/2000 | Gelderie et al. |
| 6,509,423 B1 | 1/2003 | Zhu |
| 6,623,864 B1 | 9/2003 | Sweet et al. |
| 6,831,145 B2 | 12/2004 | Kleyer et al. |
| 2003/0211333 A1 | 11/2003 | Watanabe et al. |
| 2003/0235383 A1 | 12/2003 | Gardner et al. |
| 2004/0071960 A1 | 4/2004 | Weber et al. |
| 2004/0214015 A1 | 10/2004 | Asai et al. |
| 2005/0042463 A1 | 2/2005 | Anderson et al. |
| 2006/0155039 A1 | 7/2006 | Alexander et al. |
| 2006/0204765 A1 | 9/2006 | Scheim et al. |
| 2007/0122631 A1 | 5/2007 | Higuchi et al. |
| 2007/0267215 A1 | 11/2007 | Dernovsek et al. |

(Continued)

FOREIGN PATENT DOCUMENTS

CN    1441453 A    9/2003

(Continued)

OTHER PUBLICATIONS

JP 04-190509, Jul. 8, 1992, Furukawa Electric Co. Ltd. Abstract only.
JP 09-020867, Jan. 21, 1997, Sekisui Chemical Co. Ltd. Abstract only.
JP 2003-246928, Sep. 5, 2003, Fujikura Ltd. Abstract only.
JP 59-178749, Oct. 11, 1984, Fujitsu Ltd. Abstract only.
JP 60-086017, May 15, 1985, Fujitsu Ltd. Abstract only.
JP 63-107122, May 12, 1988, Fujitsu Ltd. Abstract only.
JP 07-206482, Aug. 8, 1995, Fuigura KK. Abstract only.
JP 08-067538, Mar. 12, 1996, Fuigura KK. Abstract only.
Weber, Andreas, "6.3: Thin Glass-Polymer Systems as Flexible Substrates for Displays," SID 02 Digest, 2002, pp. 53-55, vol. 33.

(Continued)

*Primary Examiner* — D. S. Nakarani
(74) *Attorney, Agent, or Firm* — Howard & Howard Attorneys PLLC

(57) ABSTRACT

An article of manufacture comprising (i) at least one glass substrate and (ii) a coating layer on at least a portion of at least one side of the glass substrate wherein the coating layer comprises a cured silicone resin composition selected from a hydrosilylation cured silicone resin composition, a condensation cured silicone resin composition, or a free radical cured silicone resin composition; the glass being preferably a thin glass (5-500 micrometers).

10 Claims, No Drawings

U.S. PATENT DOCUMENTS

2010/0015454 A1  1/2010  Anderson et al.

FOREIGN PATENT DOCUMENTS

| DE | 28 26 261 A1 | 4/1979 |
|---|---|---|
| JP | 10-509412 A | 9/1998 |
| WO | WO 2005/017058 A1 | 2/2005 |
| WO | WO 2006/055231 A1 | 5/2006 |
| WO | WO 2006/088645 A1 | 8/2006 |
| WO | WO 2006/088646 A1 | 8/2006 |
| WO | WO 2007/018283 A1 | 2/2007 |
| WO | WO 2007/018756 A1 | 2/2007 |
| WO | WO 2007/092032 A2 | 8/2007 |

OTHER PUBLICATIONS

Guo, Adrew, "Highly Active Visible-Light Photocatalysts for Curing a Ceramic Precurosr," Chemistry of Materials, 1998, pp. 531-536, vol. 10.

Reese, Herschel, "Development of Silicone Substrates to be Used with CIGS Deposition", Air Force Report, Apr. 29, 2005.

English language abstract not available for JP 10-509412; however, see English language equivalent US 6,131,563. Original document extracted from the PAJ database on Mar. 19, 2012, 21 pages.

English language abstract not available for CN 1441453; However, see English language equivalent US 2003/0211333. Orginal document extracted from the espacenet.com database on Jul. 31, 2012, 22 pages.

GLASS SUBSTRATES COATED OR LAMINATED WITH CURED SILICONE RESIN COMPOSITIONS

CROSS REFERENCE TO RELATED APPLICATIONS

This application is a U.S. national stage filing under 35 U.S.C. §371 of PCT Application No. PCT/US07/022242 filed on 18 Oct. 2007, currently pending, which claims the benefit of U.S. Provisional Patent Application No. 60/875,952 filed 20 Dec. 2006 under 35 U.S.C. §119 (e). PCT Application No. PCT/US07/022,242 and U.S. Provisional Patent Application No. 60/875,952 are hereby incorporated by reference.

BACKGROUND OF THE INVENTION

Glass sheets of 30 to 100 micrometer thick are being produced by glass manufacturing companies. They are suitable as substrates for solar cells, displays, and other devices involving high temperature processing. They are fragile and have seen limited success, especially for large area applications. A range of polymers have been applied as a surface coating onto or laminated into the glass to help arrest cracks and flexibilize these sheets. These polymers include many of the conventional organic polymers such as polyvinyl butyral, polyvinyl acetal, polyurethane, polyacrylates, polyester, polyolefins, and others. These polymers, with limited thermal capability, compromise the ability of glass sheets to sustain high temperature exposure.

This invention relates to a new class of coated and laminated glass sheets. The polymers used with these glass sheets are cured silicone resin compositions with high temperature capability. The cured silicone resin compositions can be coated onto the surface of the glass sheets, or laminated between glass sheets with a variety of lamination structure designs, or cured with softened or molten glass to form compositionally graded/multilayer structures. The cured silicone resin compositions offer flexibility and toughness while the glass offers barrier and high temperature advantages. Both combined, the composite structure offers the typical properties of other laminated and coated glasses plus the unique advantage of superior thermal and weather resistance. The cured silicone resin compositions can be for example, hydrosilylation cured silicone resin compositions, condensation cured silicone resin compositions, or free radical cured silicone resin compositions preferably with measures taken to ensure the thickness of the resin layer is below its critical brittle-to-ductile transition thickness.

BRIEF SUMMARY OF THE INVENTION

An article of manufacture comprising (i) at least one glass substrate and (ii) a coating layer on at least a portion of at least one side of the glass substrate wherein the coating layer comprises a cured silicone resin composition selected from a hydrosilylation cured silicone resin composition, a condensation cured silicone resin composition, or a free radical cured silicone resin composition.

DETAILED DESCRIPTION OF THE INVENTION

The glass substrate of this invention can be any solid article comprised substantially of glass or other glassy solids having two opposing surfaces. The glass substrates of this invention typically have at least one flat surface onto which the cured silicone resin composition is deposited. The glass substrate can be in any form such as in the form of a glass sheet. The glass sheet is comprised of any vitreous material in a flat sheet form. The compositions of the glass could include soda-lime glass, borosilicate glass, lead-alkali glass, borate glass, silica glass, alumino-silicate glass, lead-borate glass, sodium borosilicate glass, lithium aluminosilicate glass, Chalcogenide glass, phosphate glass, alkali-barium silicate glass, and the like. They can be totally amorphous or partially crystalline. The glass sheets can be of any thickness, for example, thin and flexible glass sheets having a thickness of 5 to 1500 micrometers, or alternatively 10 to 1000 micrometers, or alternatively 10 to 750 micrometers, or alternatively 10 to 400 micrometers, or alternatively 5 to 100 micrometers for improving flexibility. The glass can contain diffusible cations such as soda-lime glass and lithium aluminosilicate glass for increasing the range of use for these glasses, and any glass sandwiched by or sandwiching cured silicone resin compositions, or the combinations of them, or the combination of them with organic polymers. One useful glass substrate is illustrated by 0211 Microglass® sheets, which are 70 to 80 micrometers thick, manufactured by Corning Incorporated (Corning, N.Y.).

The coating layer comprises a cured silicone resin composition selected from a hydrosilylation cured silicone resin composition, a condensation cured silicone resin composition, or a free radical cured silicone resin composition.

The hydrosilylation cured silicone resin composition comprises a cured product of a silicone composition comprising (A) a hydrosilylation curable silicone resin, (B) a cross-linking agent, and (C) a hydrosilylation catalyst. This cured product can be obtained by a method comprising curing a silicone composition comprising (A), (B), and (C). "Cured" as defined herein means the silicone compositions of this invention, which can be in the form of their component parts, a mixture, a solution, or a blend, have been exposed to room temperature air, heated at elevated temperatures, for example, at a temperature of from 50° C. to 450° C., or alternatively at a temperature of from 100° C. to 200° C., or exposed to UV light, electron beam, or microwave. "Curing" as defined herein means exposing to room temperature air, heating at elevated temperatures (for example, at a temperature of from 50° C. to 450° C., or alternatively to a temperature of from 100° C. to 200° C.), or exposing to UV, electron beam, or microwave, the silicone compositions of this invention, which can be in the form of their component parts, a mixture, a solution, or a blend. Heating can occur using any known conventional means such as by placing the silicone composition or the glass coated with the silicone composition into an air circulating oven set at a temperature of from 50° C. to 450° C., or alternatively at a temperature of from 100° C. to 200° C.

The hydrosilylation curable silicone resin (A) typically can contain predominantly silicon-bonded alkenyl groups or alternatively can contain predominantly silicon-bonded hydrogen atoms. The hydrosilylation curable silicone resin (A) is typically a copolymer comprising $R^1SiO_{3/2}$ units, i.e., T units, and/or $SiO_{4/2}$ units, i.e., Q units, in combination with $R^1R^2_2SiO_{1/2}$ units, i.e., M units, and/or $R^2_2SiO_{2/2}$ units, i.e., D units, wherein $R^1$ is a $C_1$ to $C_{10}$ hydrocarbyl group or a $C_1$ to $C_{10}$ halogen-substituted hydrocarbyl group, both free of aliphatic unsaturation, $R^2$ is $R^1$ or an alkenyl group or hydrogen, with the proviso that the sum of $R^1SiO_{3/2}$ units and $SiO_{4/2}$ units is greater than zero, and contains at least two silicon-bonded alkenyl groups per molecule or at least two silicon-bonded hydrogen atoms per molecule. For example, the silicone resin can be a DT resin, an MT resin, an MDT resin, a DTQ resin, and MTQ resin, and MDTQ resin, a DQ resin, an MQ resin, a DTQ resin, an MTQ resin, or an MDQ resin. As used herein, the term "free of aliphatic unsaturation" means the hydrocarbyl or halogen-substituted hydrocarbyl group does not contain an aliphatic carbon-carbon double bond or carbon-carbon triple bond.

The $C_1$ to $C_{10}$ hydrocarbyl group and $C_1$ to $C_{10}$ halogen-substituted hydrocarbyl group represented by $R^1$ more typically have from 1 to 6 carbon atoms. Acyclic hydrocarbyl and halogen-substituted hydrocarbyl groups containing at least 3 carbon atoms can have a branched or unbranched structure. Examples of hydrocarbyl groups represented by $R^1$ include, but are not limited to, alkyl groups, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl groups, such as cyclopentyl, cyclohexyl, and methylcyclohexyl; aryl groups, such as phenyl and naphthyl; alkaryl groups, such as tolyl and xylyl; and aralkyl groups, such as benzyl and phenethyl. Examples of halogen-substituted hydrocarbyl groups represented by $R^1$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

The alkenyl groups represented by $R^2$, which may be the same or different within the silicone resin, typically have from 2 to about 10 carbon atoms, alternatively from 2 to 6 carbon atoms, and are exemplified by, but not limited to, vinyl, allyl, butenyl, hexenyl, and octenyl. In one embodiment, $R^2$ is predominantly the alkenyl group. In this embodiment, typically at least 50 mol %, alternatively at least 65 mol %, alternatively at least 80 mol %, of the groups represented by $R^2$ in the silicone resin are alkenyl groups. As used herein, the mol % of alkenyl groups in $R^2$ is defined as a ratio of the number of moles of silicon-bonded alkenyl groups in the silicone resin to the total number of moles of the $R^2$ groups in the resin, multiplied by 100. In another embodiment, $R^2$ is predominantly hydrogen. In this embodiment, typically at least 50 mol %, alternatively at least 65 mol %, alternatively at least 80 mol %, of the groups represented by $R^2$ in the silicone resin are hydrogen. The mol % of hydrogen in $R^2$ is defined as a ratio of the number of moles of silicon-bonded hydrogen in the silicone resin to the total number of moles of the $R^2$ groups in the resin, multiplied by 100

According to a first embodiment, the hydrosilylation curable silicone resin (A) has the formula:

$$(R^1R^2{}_2SiO_{1/2})_w(R^2{}_2SiO_{2/2})_x(R^1SiO_{3/2})_y(SiO_{4/2})_z \quad (I)$$

wherein $R^1$ is as described above and $R^2$ is $R^1$ or an alkenyl group as described and exemplified above, w, x, y, and z are mole fractions. The silicone resin represented by formula (I) has an average of at least two silicon-bonded alkenyl groups per molecule. More specifically, the subscript w typically has a value of from 0 to 0.8, alternatively from 0.02 to 0.75, alternatively from 0.05 to 0.3. The subscript x typically has a value of from 0 to 0.6, alternatively from 0 to 0.45, alternatively from 0 to 0.25. The subscript y typically has a value of from 0 to 0.99, alternatively from 0.25 to 0.8, alternatively from 0.5 to 0.8. The subscript z typically has a value of from 0 to 0.35, alternatively from 0 to 0.25, alternatively from 0 to 0.15. Also, the sum of y+z is greater than zero and is typically from 0.2 to 0.99, alternatively from 0.5 to 0.95, alternatively from 0.65 to 0.9. Further, the sum of w+x can be zero but is typically from 0.01 to 0.80, alternatively from 0.05 to 0.5, alternatively from 0.1 to 0.35.

Examples of silicone resins represented by formula (I) above include, but are not limited to, silicone resins having the following formulae:

$$(ViMe_2SiO_{1/2})_w(PhSiO_{3/2})_y, \quad (ViMe_2SiO_{1/2})_w(MeSiO_{3/2})_y(PhSiO_{3/2})_y,$$

$$(ViMe_2SiO_{1/2})_w(PhSiO_{3/2})_y(SiO_{4/2})_z, \text{ and}$$

$$(Vi_2MeSiO_{1/2})_w(ViMe_2SiO_{1/2})_w(PhSiO_{3/2})_y$$

wherein Me is methyl, Vi is vinyl, Ph is phenyl, and wherein w, y, or z are as described above for formula (I). The sequence of units in the preceding formulae is not to be viewed in any way as limiting to the scope of the invention. Specific examples of silicone resins represented by formula (I) above include, but are not limited to, resins having the following formulae:

$$(Vi_2MeSiO_{1/2})_{0.25}(PhSiO_{3/2})_{0.75}, (ViMe_2SiO_{1/2})_{0.25}(PhSiO_{3/2})_{0.75},$$

$$(ViMe_2SiO_{1/2})_{0.25}(MeSiO_{3/2})_{0.25}(PhSiO_{3/2})_{0.50},$$

$$(ViMe_2SiO_{1/2})_{0.15}(PhSiO_{3/2})_{0.75}(SiO_{4/2})_{0.1}, \text{ and}$$

$$(Vi_2MeSiO_{1/2})_{0.15}(ViMe_2SiO_{1/2})_{0.1}(PhSiO_{3/2})_{0.75}$$

wherein Me is methyl, Vi is vinyl, Ph is phenyl, and the numerical subscripts outside the parenthesis denote mole fractions corresponding to either w, x, y, or z as described above for formula (I). The sequence of units in the preceding formulae is not to be viewed in any way as limiting to the scope of the invention.

According to a second embodiment, the hydrosilylation curable silicone resin (A) has the formula:

$$(R^1R^2{}_2SiO_{1/2})_w(R^2{}_2SiO_{2/2})_x(R^1SiO_{3/2})_y(SiO_{4/2})_z \quad (II)$$

wherein $R^1$ is as described above and $R^2$ is $R^1$ or a hydrogen atom, w, x, y, and z are mole fractions. The silicone resin represented by formula (II) has an average of at least two silicon-bonded hydrogen atoms per molecule. More specifically, the subscript w typically has a value of from 0 to 0.8, alternatively from 0.02 to 0.75, alternatively from 0.05 to 0.3. The subscript x typically has a value of from 0 to 0.6, alternatively from 0 to 0.45, alternatively from 0 to 0.25. The subscript y typically has a value of from 0 to 0.99, alternatively from 0.25 to 0.8, alternatively from 0.5 to 0.8. The subscript z typically has a value of from 0 to 0.35, alternatively from 0 to 0.25, alternatively from 0 to 0.15. Also, the sum of y+z is greater than zero and is typically from 0.2 to 0.99, alternatively from 0.5 to 0.95, alternatively from 0.65 to 0.9. Further, the sum of w+x can be zero but is typically from 0.01 to 0.80, alternatively from 0.05 to 0.5, alternatively from 0.1 to 0.35.

Examples of hydrosilylation curable silicone resins represented by formula (II) above include, but are not limited to, resins having the following formulae:

$$(HMe_2SiO_{1/2})_w(PhSiO_{3/2})_y, (HMeSiO_{2/2})_x(PhSiO_{3/2})_y(MeSiO_{3/2})_y, \text{ and}$$

$$(Me_3SiO_{1/2})_w(H_2SiO_{2/2})_x(MeSiO_{3/2})_y(PhSiO_{3/2})_y,$$

wherein Me is methyl, Ph is phenyl, and w, x, and y are as defined above. The sequence of units in the preceding formulae is not to be viewed in any way as limiting to the scope of the invention. Specific examples of silicone resins represented by formula (II) above include, but are not limited to, resins having the following formulae:

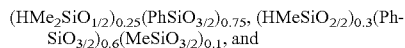

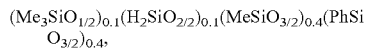

wherein Me is methyl, Ph is phenyl, and the numerical subscripts outside the parenthesis denote mole fractions. The sequence of units in the preceding formulae is not to be viewed in any way as limiting to the scope of the invention.

The silicone resin represented by formula (I) or (II) typically has a number-average molecular weight ($M_n$) of from 500 to 50,000, alternatively from 500 to 10,000, alternatively 1,000 to 3,000, where the molecular weight is determined by gel permeation chromatography employing a refractive index detector and silicone resin (MQ) standards.

The viscosity of the silicone resin represented by formula (I) or (II) at 25° C. is typically from 0.01 to 100,000 Pa·s, alternatively from 0.1 to 10,000 Pa·s, alternatively from 1 to 100 Pa·s.

The silicone resin represented by formula (I) or (II) typically includes less than 10% (w/w), alternatively less than 5% (w/w), alternatively less than 2% (w/w), of silicon-bonded hydroxy groups, as determined by $^{29}Si$ NMR.

Methods of preparing silicone resins represented by formula (I) or (II) are well known in the art; many of these resins are commercially available. Silicone resins represented by formula (I) or (II) are typically prepared by cohydrolyzing the appropriate mixture of chlorosilane precursors in an organic solvent, such as toluene. For example, a silicone resin including $R^1R^2{}_2SiO_{1/2}$ units and $R^1SiO_{3/2}$ units can be prepared by cohydrolyzing a first compound having the formula $R^1R^2{}_2SiCl$ and a second compound having the formula $R^1SiCl_3$ in toluene, where $R^1$ and $R^2$ are as defined and exemplified above, to form aqueous hydrochloric acid and the silicone resin, which is a hydrolyzate of the first and second compounds. The aqueous hydrochloric acid and the silicone resin are separated, the silicone resin is washed with water to remove residual acid, and the silicone resin is heated in the presence of a mild condensation catalyst to "body" the silicone resin to a desired viscosity.

If desired, the silicone resin can be further treated with a condensation catalyst in an organic solvent to reduce the content of silicon-bonded hydroxy groups. Alternatively, first or second compounds containing hydrolysable groups other than chloro, such —Br, —I, —OCH$_3$, —OC(O)CH$_3$, —N(CH$_3$)$_2$, NHCOCH$_3$, and —SCH$_3$, can be co-hydrolyzed to form the silicone resin. The properties of the silicone resin depend on the types of first and second compounds, the mole ratio of first and second compounds, the degree of condensation, and the processing conditions.

Cross-linking agent (B) is typically a compound having silicon-bonded hydrogen atoms or silicon-bonded alkenyl groups capable of reacting with the silicon-bonded alkenyl groups or silicon-bonded hydrogen atoms in silicone resin (A). When the silicone resin (A) has the formula (I), the cross-linking agent (B) has an average of at least two silicon-bonded hydrogen atoms per molecule, alternatively at least three silicon-bonded hydrogen atoms per molecule. It is generally understood that cross-linking occurs when the sum of the average number of alkenyl groups per molecule in the silicone resin (A) and the average number of silicon-bonded hydrogen atoms per molecule in the cross-linking agent (B) is greater than four. The cross-linking agent (B) is present in an amount sufficient to cure the silicone resin (A).

When silicone resin (A) has the formula (I) the cross-linking agent (B) is typically an organohydrogensilane, an organohydrogensiloxane, or a combination thereof. The structure of the organosilicon compound can be linear, branched, cyclic, or resinous. In acyclic polysilanes and polysiloxanes, the silicon-bonded hydrogen atoms can be located at terminal, pendant, or at both terminal and pendant positions. Cyclosilanes and cyclosiloxanes typically have from 3 to 12 silicon atoms, alternatively from 3 to 10 silicon atoms, alternatively from 3 to 4 silicon atoms.

The organohydrogensilane can be a monosilane, disilane, trisilane, or polysilane. Specific examples of organohydrogensilanes that are suitable for purposes of the present invention include, but are not limited to, diphenylsilane, 2-chloroethylsilane, bis[(p-dimethylsilyl)phenyl]ether, 1,4-dimethyldisilylethane, 1,3,5-tris(dimethylsilyl)benzene, 1,3,5-trimethyl-1,3,5-trisilane, poly(methylsilylene)phenylene, and poly(methylsilylene)methylene. The organohydrogensilane can have the formula:

wherein $R^1$ is as defined and exemplified above and $R^3$ is a hydrocarbylene group free of aliphatic unsaturation having a formula selected from the following structures:

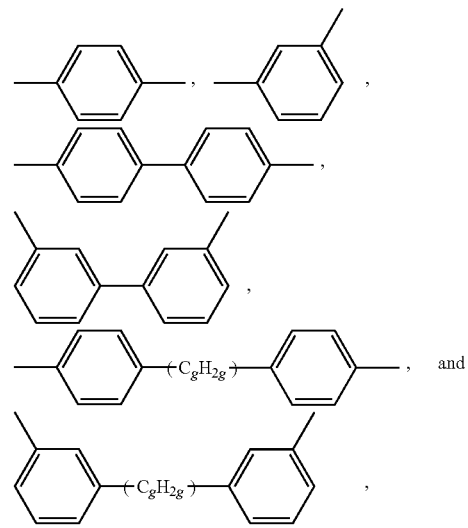

wherein g is from 1 to 6.

Specific examples of organohydrogensilanes having the formula (III), wherein $R^1$ and $R^3$ are as described and exemplified above include, but are not limited to, organohydrogensilanes having a formula selected from the following structures:

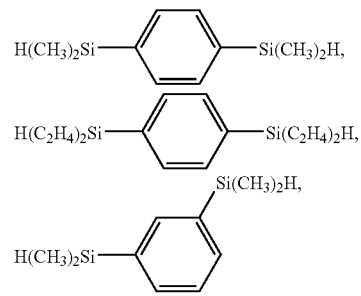

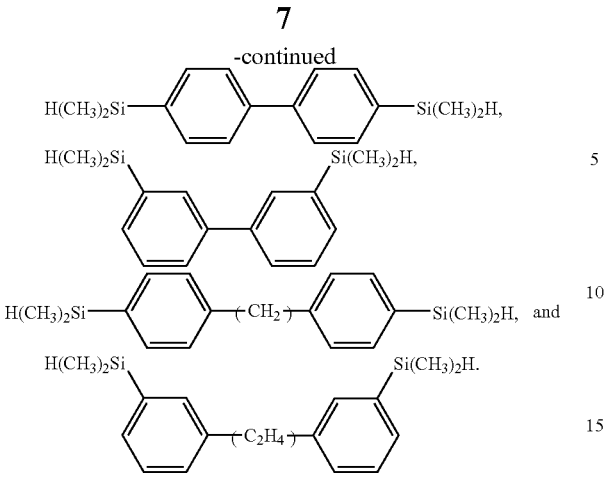

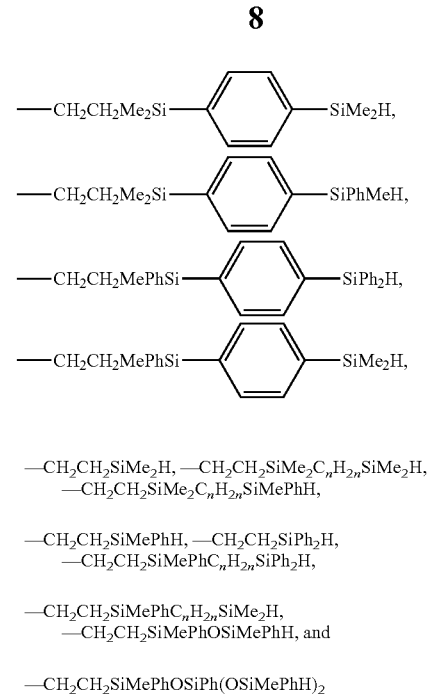

Methods of preparing the organohydrogensilanes are known in the art. For example, organohydrogensilanes can be prepared by reaction of Grignard reagents with alkyl or aryl halides. In particular, organohydrogensilanes having the formula $HR^1_2Si\text{—}R^3\text{—}SiR^1_2H$ can be prepared by treating an aryl dihalide having the formula $R^3X_2$ with magnesium in ether to produce the corresponding Grignard reagent and then treating the Grignard reagent with a chlorosilane having the formula $HR^1_2SiCl$, where $R^1$ and $R^3$ are as described and exemplified above.

The organohydrogensiloxane can be a disiloxane, trisiloxane, or polysiloxane. Examples of organosiloxanes suitable for use as the cross-linking agent (B) when $R^2$ is predominantly hydrogen include, but are not limited to, siloxanes having the following formulae:

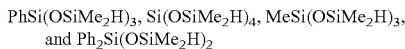

wherein Me is methyl, and Ph is phenyl.

Specific examples of organohydrogensiloxanes that are suitable for purposes of the present invention when $R^2$ is predominantly alkenyl group including, but are not limited to, 1,1,3,3-tetramethyldisiloxane, 1,1,3,3-tetraphenyldisiloxane, phenyltris(dimethylsiloxy)silane, 1,3,5-trimethylcyclotrisiloxane, a trimethylsiloxy-terminated poly(methylhydrogensiloxane), a trimethylsiloxy-terminated poly(dimethylsiloxane/methylhydrogensiloxane), a dimethylhydrogensiloxy-terminated poly(methylhydrogensiloxane), and a resin including $HMe_2SiO_{1/2}$ units, $Me_3SiO_{1/2}$ units, and $SiO_{4/2}$ units, wherein Me is methyl.

The organohydrogensiloxane can also be an organohydrogenpolysiloxane resin. The organohydrogenpolysiloxane resin is typically a copolymer including $R^1SiO_{3/2}$ units, i.e., T units, and/or $SiO_{4/2}$ units, i.e., Q units, in combination with $R^1R^4_2SiO_{1/2}$ units, i.e., M units, and/or $R^4_2SiO_{2/2}$ units, i.e., D units wherein $R^1$ is as described and exemplified above. For example, the organohydrogenpolysiloxane resin can be a DT resin, an MT resin, an MDT resin, a DTQ resin, and MTQ resin, and MDTQ resin, a DQ resin, an MQ resin, a DTQ resin, an MTQ resin, or an MDQ resin.

The group represented by $R^4$ is either $R^1$ or an organosilylalkyl group having at least one silicon-bonded hydrogen atom. Examples of organosilylalkyl groups represented by $R^4$ include, but are not limited to, groups having a formula selected from the following structures:

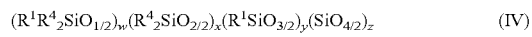

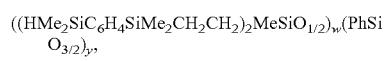

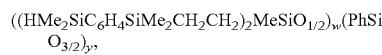

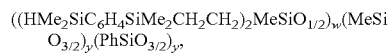

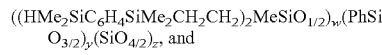

—$CH_2CH_2SiMe_2H$, —$CH_2CH_2SiMe_2C_nH_{2n}SiMe_2H$,
—$CH_2CH_2SiMe_2C_nH_{2n}SiMePhH$,

—$CH_2CH_2SiMePhH$, —$CH_2CH_2SiPh_2H$,
—$CH_2CH_2SiMePhC_nH_{2n}SiPh_2H$,

—$CH_2CH_2SiMePhC_nH_{2n}SiMe_2H$,
—$CH_2CH_2SiMePhOSiMePhH$, and

—$CH_2CH_2SiMePhOSiPh(OSiMePhH)_2$ wherein Me is methyl, Ph is phenyl, and the subscript n has a value of from 2 to 10. Typically, at least 50 mol %, alternatively at least 65 mol %, alternatively at least 80 mol % of the groups represented by $R^4$ in the organohydrogenpolysiloxane resin are organosilylalkyl groups having at least one silicon-bonded hydrogen atom. As used herein, the mol % of organosilylalkyl groups in $R^4$ is defined as a ratio of the number of moles of silicon-bonded organosilylalkyl groups in the silicone resin to the total number of moles of the $R^4$ groups in the resin, multiplied by 100.

The organohydrogenpolysiloxane resin typically has the formula:

$$(R^1R^4_2SiO_{1/2})_w(R^4_2SiO_{2/2})_x(R^1SiO_{3/2})_y(SiO_{4/2})_z \quad (IV)$$

wherein $R^1$, $R^4$, w, x, y, and z are each as defined and exemplified above.

Examples of organohydrogenpolysiloxane resins include, but are not limited to, resins having the following formulae:

$((HMe_2SiC_6H_4SiMe_2CH_2CH_2)_2MeSiO_{1/2})_w(PhSiO_{3/2})_y$, $((HMe_2SiC_6H_4SiMe_2CH_2CH_2)_2MeSiO_{1/2})_w(PhSiO_{3/2})_y$, $((HMe_2SiC_6H_4SiMe_2CH_2CH_2)_2MeSiO_{1/2})_w(MeSiO_{3/2})_y(PhSiO_{3/2})_y$, $((HMe_2SiC_6H_4SiMe_2CH_2CH_2)_2MeSiO_{1/2})_w(PhSiO_{3/2})_y(SiO_{4/2})_z$, and $((HMe_2SiC_6H_4SiMe_2CH_2CH_2)_2MeSiO_{1/2})_w((HMe_2SiC_6H_4SiMe_2CH_2CH_2)Me_2SiO_{1/2})_w(PhSiO_{3/2})_y$ where Me is methyl, Ph is phenyl, $C_6H_4$ denotes a para-phenylene group, and w, y, and z are as defined above. The sequence of units in the preceding formulae is not to be viewed in any way as limiting to the scope of the invention. Specific examples of organohydrogenpolysiloxane resins include, but are not limited to, resins having the following formulae:

$((HMe_2SiC_6H_4SiMe_2CH_2CH_2)_2MeSiO_{1/2})_{0.12}(PhSiO_{3/2})_{0.88}$, $((HMe_2SiC_6H_4SiMe_2CH_2CH_2)_2MeSiO_{1/2})_{0.17}(PhSiO_{3/2})_{0.83}$, $((HMe_2SiC_6H_4SiMe_2CH_2CH_2)_2MeSiO_{1/2})_{0.17}(MeSiO_{3/2})_{0.17}(PhSiO_{3/2})_{0.66}$, $((HMe_2SiC_6H_4SiMe_2CH_2CH_2)_2MeSiO_{1/2})_{0.15}(PhSiO_{3/2})_{0.75}(SiO_{4/2})_{0.10}$, and $((HMe_2SiC_6H_4SiMe_2CH_2CH_2)_2MeSiO_{1/2})_{0.08}((HMe_2SiC_6H_4SiMe_2CH_2CH_2)Me_2SiO_{1/2})_{0.06}(PhSiO_{3/2})_{0.86}$ where Me is methyl, Ph is phenyl, $C_6H_4$ denotes a paraphenylene group, and the numerical subscripts outside the parenthesis denote mole fractions. The sequence of units in the preceding formulae is not to be viewed in any way as limiting to the scope of the invention.

The organohydrogenpolysiloxane resin having the formula (IV) can be prepared by reacting a reaction mixture including (a) a silicone resin having the formula $(R^1R^2_2SiO_{1/2})_w(R^2_2SiO_{2/2})_x(R^1SiO_{3/2})_y(SiO_{4/2})_z$ represented by formula (I) above and an organosilicon compound (b) having an average of from two to four silicon-bonded hydrogen atoms per molecule and a molecular weight less than 1,000, in the presence of (c) a hydrosilylation catalyst and, optionally, (d) an organic solvent, wherein $R^1$, $R^2$, w, x, y, and z are each as defined and exemplified above, provided the silicone resin (a) has an average of at least two silicon-bonded alkenyl groups per molecule, and the mole ratio of silicon-bonded hydrogen atoms in (b) to alkenyl groups in (a) is from 1.5 to 5. Silicone resin (a) can be the same as or different than the specific silicone resin used as component (A) in the silicone composition comprising a hydrosilylation curable silicone resin.

As set forth above, organosilicon compound (b) has an average of from two to four silicon-bonded hydrogen atoms per molecule. Alternatively, the organosilicon compound (b) has an average of from two to three silicon-bonded hydrogen atoms per molecule. As also set forth above, the organosilicon compound (b) typically has a molecular weight less than 1,000, alternatively less than 750, alternatively less than 500. The organosilicon compound (b) further includes silicon-bonded organic groups that may be selected from the group of hydrocarbyl groups and halogen-substituted hydrocarbyl groups, both free of aliphatic unsaturation, which are as described and exemplified above for $R^1$.

Organosilicon compound (b) can be an organohydrogensilane or an organohydrogensiloxane, each of which are defined and exemplified in detail above.

Organosilicon compound (b) can be a single organosilicon compound or a mixture comprising two or more different organosilicon compounds, each as described above. For example, organosilicon compound (b) can be a single organohydrogensilane, a mixture of two different organohydrogensilanes, a single organohydrogensiloxane, a mixture of two different organohydrogensiloxanes, or a mixture of an organohydrogensilane and an organohydrogensiloxane. The mole ratio of silicon-bonded hydrogen atoms in organosilicon compound (b) to alkenyl groups in silicone resin (a) is typically from 1.5 to 5, alternatively from 1.75 to 3, alternatively from 2 to 2.5.

Hydrosilylation catalyst (c) can be any of the well-known hydrosilylation catalysts comprising a platinum group metal (i.e., platinum, rhodium, ruthenium, palladium, osmium and iridium) or a compound containing a platinum group metal. Preferably, the platinum group metal is platinum, based on its high activity in hydrosilylation reactions.

Specific hydrosilylation catalysts suitable for (c) include the complexes of chloroplatinic acid and certain vinyl-containing organosiloxanes disclosed by Willing in U.S. Pat. No. 3,419,593, which is hereby incorporated by reference. A catalyst of this type is the reaction product of chloroplatinic acid and 1,3-diethenyl-1,1,3,3-tetramethyldisiloxane.

The hydrosilylation catalyst can also be a supported hydrosilylation catalyst comprising a solid support having a platinum group metal on the surface thereof. A supported catalyst can be conveniently separated from the organohydrogenpolysiloxane resin represented by formula (IV), for example, by filtering the reaction mixture. Examples of supported catalysts include, but are not limited to, platinum on carbon, palladium on carbon, ruthenium on carbon, rhodium on carbon, platinum on silica, palladium on silica, platinum on alumina, palladium on alumina, and ruthenium on alumina.

The concentration of hydrosilylation catalyst (c) is sufficient to catalyze the addition reaction of silicone resin (a) with organosilicon compound (b). Typically, the concentration of hydrosilylation catalyst (c) is sufficient to provide from 0.1 to 1000 ppm of a platinum group metal, alternatively from 1 to 500 ppm of a platinum group metal, alternatively from 5 to 150 ppm of a platinum group metal, based on the combined weight of silicone resin (a) and organosilicon compound (b). The rate of reaction is very slow below 0.1 ppm of platinum group metal. The use of more than 1000 ppm of platinum group metal results in no appreciable increase in reaction rate, and is therefore uneconomical.

Organic solvent (d) is at least one organic solvent. The organic solvent (d) can be any aprotic or dipolar aprotic organic solvent that does not react with silicone resin (a), organosilicon compound (b), or the resulting organohydrogenpolysiloxane resin under the conditions of the present method, and is miscible with components (a), (b), and the organohydrogenpolysiloxane resin.

Examples of organic solvents (d) that are suitable for purposes of the present invention include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; and halogenated aromatic hydrocarbons such as bromobenzene and chlorobenzene. Organic solvent (d) can be a single organic solvent or a mixture comprising two or more different organic solvents, each as described above. The concentration of organic solvent (d) is typically from 0 to 99% (w/w), alternatively from 30 to 80% (w/w), alternatively from 45 to 60% (w/w), based on the total weight of the reaction mixture.

The reaction to form the organohydrogenpolysiloxane resin represented by formula (IV) can be carried out in any standard reactor suitable for hydrosilylation reactions. Suitable reactors include glass and Teflon-lined glass reactors. Preferably, the reactor is equipped with a means of agitation, such as stirring. Also, preferably, the reaction is carried out in an inert atmosphere, such as nitrogen or argon, in the absence of moisture.

The silicone resin (a), organosilicon compound (b), hydrosilylation catalyst (c), and, optionally, organic solvent (d), can be combined in any order. Typically, organosilicon compound (b) and hydrosilylation catalyst (c) are combined before the introduction of the silicone resin (a) and, optionally, organic solvent (d). The reaction is typically carried out at a temperature of from 0 to 150° C., alternatively from room temperature (~23±2° C.) to 115° C. When the temperature is less than 0° C., the rate of reaction is typically very slow. The reaction time depends on several factors, such as the structures of the silicone resin (a) and the organosilicon compound (b), and the temperature. The time of reaction is typically from 1 to 24 h at a temperature of from room temperature (~23±2° C.) to 150° C. The optimum reaction time can be determined by routine experimentation.

The organohydrogenpolysiloxane resin represented by formula (IV) can be used without isolation or purification or the organohydrogenpolysiloxane resin can be separated from most of the organic solvent (d) by conventional methods of evaporation. For example, the reaction mixture can be heated under reduced pressure. Moreover, when the hydrosilylation catalyst (c) is a supported catalyst, as described above, the organohydrogenpolysiloxane resin can be readily separated from the hydrosilylation catalyst (c) by filtering the reaction mixture. However, the hydrosilylation catalyst may remain mixed with the organohydrogenpolysiloxane resin and be used as hydrosilylation catalyst (C).

The cross-linking agent (B) can be a single organosilicon compound or a mixture comprising two or more different organosilicon compounds, each as described above. For example, the cross-linking agent (B) can be a single organohydrogensilane, a mixture of two different organohydrogensilanes, a single organohydrogensiloxane, a mixture of two different organohydrogensiloxanes, or a mixture of an organohydrogensilane and an organohydrogensiloxane. In particular, the cross-linking agent (B) can be a mixture comprising the organohydrogenpolysiloxane resin having the formula (IV) in an amount of at least 0.5% (w/w), alternatively at least 50% (w/w), alternatively at least 75% (w/w), based on the total weight of the cross-linking agent (B), with the cross-linking agent (B) further comprising an organohydrogensilane and/or organohydrogensiloxane, the latter different from the organohydrogenpolysiloxane resin.

The concentration of cross-linking agent (B) is sufficient to cure (cross-link) the silicone resin (A). The exact amount of cross-linking agent (B) depends on the desired extent of cure, which generally increases as the ratio of the number of moles of silicon-bonded hydrogen atoms in cross-linking agent (B) to the number of moles of alkenyl groups in the silicone resin (A) increases. The concentration of cross-linking agent (B) is typically sufficient to provide from 0.4 to 2 moles of silicon-bonded hydrogen atoms, alternatively from 0.8 to 1.5 moles of silicon-bonded hydrogen atoms, alternatively from 0.9 to 1.1 moles of silicon-bonded hydrogen atoms, per mole of alkenyl groups in silicone resin (A).

When silicone resin (A) has the formula (II), specific examples of organosilanes that are suitable for purposes of the present invention include, but are not limited to, silanes having the following formulae:

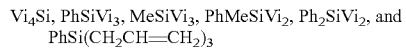

wherein Me is methyl, Ph is phenyl, and Vi is vinyl.

Hydrosilylation catalyst (C) includes at least one hydrosilylation catalyst that promotes the reaction between silicone resin (A) and cross-linking agent (B). In one embodiment, the hydrosilylation catalyst (C) may be the same as the hydrosilylation catalyst (c) described above for producing the organohydrogenpolysiloxane resin. In addition, the hydrosilylation catalyst (C) can also be a microencapsulated platinum group metal-containing catalyst comprising a platinum group metal encapsulated in a thermoplastic resin. Microencapsulated hydrosilylation catalysts are stable for extended periods of time, typically several months or longer, under ambient conditions, yet cure relatively rapidly at temperatures above the melting or softening point of the thermoplastic resin(s). Microencapsulated hydrosilylation catalysts and methods of preparing them are well known in the art, as exemplified in U.S. Pat. No. 4,766,176 and the references cited therein, and U.S. Pat. No. 5,017,654. The hydrosilylation catalyst (C) can be a single catalyst or a mixture comprising two or more different catalysts that differ in at least one property, such as structure, form, platinum group metal, complexing ligand, and thermoplastic resin.

In another embodiment, the hydrosilylation catalyst (C) may be at least one photoactivated hydrosilylation catalyst. The photoactivated hydrosilylation catalyst can be any hydrosilylation catalyst capable of catalyzing the hydrosilylation of the silicone resin (A) and the cross-linking agent (B) upon exposure to radiation having a wavelength of from 150 to 800 nm. The photoactivated hydrosilylation catalyst can be any of the well-known hydrosilylation catalysts comprising a platinum group metal or a compound containing a platinum group metal. The platinum group metals include platinum, rhodium, ruthenium, palladium, osmium and iridium. Typically, the platinum group metal is platinum, based on its high activity in hydrosilylation reactions. The suitability of particular photoactivated hydrosilylation catalyst for use in the silicone composition of the present invention can be readily determined by routine experimentation.

Specific examples of photoactivated hydrosilylation catalysts suitable for purposes of the present invention include, but are not limited to, platinum(II) β-diketonate complexes such as platinum(II) bis(2,4-pentanedioate), platinum(II) bis(2,4-hexanedioate), platinum(II) bis(2,4-heptanedioate), platinum(II) bis(1-phenyl-1,3-butanedioate, platinum(II) bis(1,3-diphenyl-1,3-propanedioate), platinum(II) bis(1,1,1,5,5,5-hexafluoro-2,4-pentanedioate); (η-cyclopentadienyl)trialkylplatinum complexes, such as (Cp)trimethylplatinum, (Cp)ethyldimethylplatinum, (Cp)triethylplatinum, (chloro-Cp)trimethylplatinum, and (trimethylsilyl-Cp)trimethylplatinum, where Cp represents cyclopentadienyl; triazene oxide-transition metal complexes, such as Pt[C$_6$H$_5$NNNOCH$_3$]$_4$, Pt[p-CN—C$_6$H$_4$NNNOC$_6$H$_{11}$]$_4$, Pt[p-H$_3$COC$_6$H$_4$NNNOC$_6$H$_{11}$]$_4$, Pt[p-CH$_3$(CH$_2$)$_x$—C$_6$H$_4$NNNOCH$_3$]$_4$, 1,5-cyclooctadiene.Pt[p-CN—C$_6$H$_4$NNNOC$_6$H$_{11}$]$_2$, 1,5-cyclooctadiene.Pt[p-CH$_3$O—C$_6$H$_4$NNNOCH$_3$]$_2$, [(C$_6$H$_5$)$_3$P]$_3$Rh[p-CN—C$_6$H$_4$NNNOC$_6$H$_{11}$], and Pd[p-CH$_3$(CH$_2$)$_x$—C$_6$H$_4$NNNOCH$_3$]$_2$, where x is 1, 3, 5, 11, or 17; (η-diolefin)(σ-aryl)platinum complexes, such as (η$^4$-1,5-cyclooctadienyl)diphenylplatinum, η$^4$-1,3,5,7-cyclooctatetraenyl)diphenylplatinum, (η$^4$-2,5-norboradienyl)diphenylplatinum, (η$^4$-1,5-cyclooctadienyl)bis-(4-dimethylaminophenyl)platinum, (η$^4$-1,5-cyclooctadienyl)bis-(4-acetylphenyl)platinum, and (η$^4$-1,5-cyclooctadienyl)bis-(4-trifluormethylphenyl)platinum.

Preferably, the photoactivated hydrosilylation catalyst is a Pt(II) β-diketonate complex and more preferably the catalyst is platinum(II) bis(2,4-pentanedioate). The hydrosilylation catalyst (C) can be a single photoactivated hydrosilylation catalyst or a mixture comprising two or more different photoactivated hydrosilylation catalysts.

Methods of preparing photoactivated hydrosilylation catalysts are well known in the art. For example, methods of preparing platinum(II) β-diketonates are reported by Guo et al. (Chemistry of Materials, 1998, 10, 531-536). Methods of preparing (η-cyclopentadienyl)-trialkylplatinum complexes and are disclosed in U.S. Pat. No. 4,510,094. Methods of preparing triazene oxide-transition metal complexes are disclosed in U.S. Pat. No. 5,496,961. And, methods of preparing (η-diolefin)(σ-aryl)platinum complexes are taught in U.S. Pat. No. 4,530,879.

The concentration of the hydrosilylation catalyst (C) is sufficient to catalyze the addition reaction of the silicone resin (A) and the cross-linking agent (B). The concentration of the hydrosilylation catalyst (C) is sufficient to provide typically from 0.1 to 1000 ppm of platinum group metal, alternatively from 0.5 to 100 ppm of platinum group metal, alternatively from 1 to 25 ppm of platinum group metal, based on the combined weight of the silicone resin (A) and the cross-linking agent (B).

Optionally, the silicone composition comprising at least one hydrosilylation curable silicone resin further comprises (D) a silicone rubber. The silicone rubber is exemplified by a compound having its formula selected from
(i) $R^1R^2{}_2SiO(R^2{}_2SiO)_aSiR^2{}_2R^1$ or (ii) $R^5R^1{}_2SiO(R^1R^5SiO)_b SiR^1{}_2R^5$; wherein $R^1$ and $R^2$ are as defined and exemplified above, $R^5$ is $R^1$ or —H, subscripts a and b each have a value of from 1 to 4, from 2 to 4 or from 2 to 3, and w, x, y, and z are also as defined and exemplified above, provided the silicone resin and the silicone rubber (D)(i) each have an average of at least two silicon-bonded alkenyl groups per molecule, the silicone rubber (D)(ii) has an average of at least two silicon-bonded hydrogen atoms per molecule, and the mole ratio of silicon-bonded alkenyl groups or silicon-bonded hydrogen atoms in the silicone rubber (D) to silicon-bonded alkenyl groups in the silicone resin (A) is from 0.01 to 0.5.

Specific examples of silicone rubbers suitable for use as component (D)(i) include, but are not limited to, silicone rubbers having the following formulae:

$ViMe_2SiO(Me_2SiO)_aSiMe_2Vi$, $ViMe_2SiO(Ph_2SiO)_a SiMe_2Vi$, and $ViMe_2SiO(PhMeSiO)_aSiMe_2Vi$, wherein Me is methyl, Ph is phenyl, Vi is vinyl, and the subscript a has a value of from 1 to 4. Silicone rubber (D)(i) can be a single silicone rubber or a mixture comprising two or more different silicone rubbers that each satisfy the formula for (D)(i).

Specific examples of silicone rubbers suitable for use as silicone rubber (D)(ii) include, but are not limited to, silicone rubbers having the following formulae:

$HMe_2SiO(Me_2SiO)_bSiMe_2H$, $HMe_2SiO(Ph_2SiO)_b SiMe_2H$, $HMe_2SiO(PhMeSiO)_bSiMe_2H$, and $HMe_2SiO(Ph_2SiO)_2(Me_2SiO)_2SiMe_2H$, wherein Me is methyl, Ph is phenyl, and the subscript b has a value of from 1 to 4. Component (D)(ii) can be a single silicone rubber or a mixture comprising two or more different silicone rubbers that each satisfy the formula for (D)(ii).

The mole ratio of silicon-bonded alkenyl groups or silicon-bonded hydrogen atoms in the silicone rubber (D) to silicon-bonded alkenyl groups in the silicone resin (A) is typically from 0.01 to 0.5, alternatively from 0.05 to 0.4, alternatively from 0.1 to 0.3.

When the silicone rubber (D) is (D)(i), the concentration of the cross-linking agent (B) is such that the ratio of the number of moles of silicon-bonded hydrogen atoms in the cross-linking agent (B) to the sum of the number of moles of silicon-bonded alkenyl groups in the silicone resin (A) and the silicone rubber (D)(i) is typically from 0.4 to 2, alternatively from 0.8 to 1.5, alternatively from 0.9 to 1.1. Furthermore, when the silicone rubber (D) is (D)(ii), the concentration of the cross-linking agent (B) is such that the ratio of the sum of the number of moles of silicon-bonded hydrogen atoms in the cross-linking agent (B) and the silicone rubber (D)(ii) to the number of moles of silicon-bonded alkenyl groups in the silicone resin (A) is typically from 0.4 to 2, alternatively from 0.8 to 1.5, alternatively from 0.9 to 1.1.

Methods of preparing silicone rubbers containing silicon-bonded alkenyl groups or silicon-bonded hydrogen atoms are well known in the art; many of these compounds are commercially available.

In another embodiment of the present invention, the hydrosilylation curable silicone resin (A) above can be a rubber-modified silicone resin. The rubber-modified silicone resin is exemplified by a rubber-modified silicone resin prepared by a method comprising reacting the silicone resin (A) described above and a silicone rubber (D)(iii) having the following formulae:

$R^5R^1{}_2SiO(R^1R^5SiO)_cSiR^1{}_2R^5$ and $R^1R^2{}_2SiO(R^2{}_2SiO)_dSiR^2{}_2R^1$ wherein $R^1$ and $R^5$ are as defined and exemplified above and c and d each have a value of greater than 4 to 1000, alternatively from 10 to 500, alternatively from 10 to 50, in the presence of hydrosilylation catalyst (c) as described above and, optionally, (d) an organic solvent as described above, provided the silicone resin (A) has an average of at least two silicon-bonded alkenyl groups per molecule, the silicone rubber (D)(iii) has an average of at least two silicon-bonded hydrogen atoms per molecule, and the mole ratio of silicon-bonded hydrogen atoms in the silicone rubber (D)(iii) to silicon-bonded alkenyl groups in silicone resin (A) is from 0.01 to 0.5. When organic solvent is present, the rubber-modified silicone resin is miscible in the organic solvent and does not form a precipitate or suspension.

The silicone resin (A), silicone rubber (D)(iii), hydrosilylation catalyst (c), and organic solvent can be combined in any order. Typically, the silicone resin (A), silicone rubber (D) (iii), and organic solvent are combined before the introduction of the hydrosilylation catalyst (c).

The reaction is typically carried out at a temperature of from room temperature ($\sim 23\pm 2°$ C.) to 150° C., alternatively from room temperature to 100° C. The reaction time depends on several factors, including the structures of the silicone resin (A) and the silicone rubber (D)(iii) and the temperature. The components are typically allowed to react for a period of time sufficient to complete the hydrosilylation reaction. This means the components are typically allowed to react until at least 95 mol %, alternatively at least 98 mol %, alternatively at least 99 mol %, of the silicon-bonded hydrogen atoms originally present in the silicone rubber (D)(iii) have been consumed in the hydrosilylation reaction, as determined by FTIR spectrometry. The time of reaction is typically from 0.5 to 24 h at a temperature of from room temperature ($\sim 23\pm 2°$ C.) to 100° C. The optimum reaction time can be determined by routine experimentation.

The mole ratio of silicon-bonded hydrogen atoms in the silicone rubber (D)(iii) to silicon-bonded alkenyl groups in the silicone resin (A) is typically from 0.01 to 0.5, alternatively from 0.05 to 0.4, alternatively from 0.1 to 0.3.

The concentration of the hydrosilylation catalyst (c) is sufficient to catalyze the addition reaction of the silicone resin (A) with the silicone rubber (D)(iii). Typically, the concentration of the hydrosilylation catalyst (c) is sufficient to provide from 0.1 to 1000 ppm of a platinum group metal, based on the combined weight of the resin and the rubber.

The concentration of the organic solvent is typically from 0 to 95% (w/w), alternatively from 10 to 75% (w/w), alternatively from 40 to 60% (w/w), based on the total weight of the reaction mixture.

The rubber-modified silicone resin can be used without isolation or purification or the rubber-modified silicone resin can be separated from most of the solvent by conventional methods of evaporation. For example, the reaction mixture can be heated under reduced pressure. Moreover, when the hydrosilylation catalyst (c) is a supported catalyst, described above, the rubber-modified silicone resin can be readily separated from the hydrosilylation catalyst (c) by filtering the reaction mixture. However, when the rubber-modified silicone resin is not separated from the hydrosilylation catalyst (c) used to prepare the rubber-modified silicone resin, the hydrosilylation catalyst (c) may be used as the hydrosilylation catalyst (C).

The silicone compositions comprising at least one hydrosilylation curable silicone resin of the present invention can further comprise additional ingredients, as known in the art. Examples of additional ingredients include, but are not limited to, hydrosilylation catalyst inhibitors, such as 3-methyl-3-penten-1-yne, 3,5-dimethyl-3-hexen-1-yne, 3,5-dimethyl-1-hexyn-3-ol, 1-ethynyl-1-cyclohexanol, 2-phenyl-3-butyn-2-ol, vinylcyclosiloxanes, and triphenylphosphine; adhesion promoters, such as the adhesion promoters taught in U.S. Pat. Nos. 4,087,585 and 5,194,649; dyes; pigments; anti-oxidants; heat stabilizers; UV stabilizers; flame retardants; flow control additives; and diluents, such as organic solvents and reactive diluents.

The coating layer can also comprise a condensation cured silicone resin composition. The condensation cured silicone resin composition comprises a cured product of a silicone composition comprising ($A^1$) a condensation curable silicone resin having silicon-bonded hydrogen atoms, silicon bonded hydroxy groups, or silicon-bonded hydrolysable groups and, optionally, ($B^1$) a cross-linking agent having silicon-bonded hydrolysable groups and optionally ($C^1$) a condensation catalyst. This cured product can be obtained by a method comprising curing a silicone composition comprising ($A^1$), optionally ($B^1$), and optionally ($C^1$). The silicone resin ($A^1$) is typically a copolymer containing T and/or Q siloxane units in combination with M and/or D siloxane units.

According to one embodiment, the condensation curable silicone resin ($A^1$) has the formula:

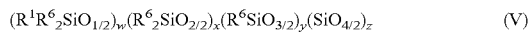

wherein $R^1$ is as defined and exemplified above, $R^6$ is $R^1$, —H, —OH, or a hydrolysable group, and w, x, y, and z are the same as defined and exemplified above, and the silicone resin ($A^1$) has an average of at least two silicon-bonded hydrogen atoms, at least two silicon-bonded hydroxy groups, or at least two silicon-bonded hydrolysable groups per molecule. As used herein the term "hydrolysable group" means the silicon-bonded group reacts with water in the absence of a catalyst at any temperature from room temperature (~23±2° C.) to 100° C. within several minutes, for example thirty minutes, to form a silanol (Si—OH) group. Examples of hydrolysable groups represented by $R^6$ include, but are not limited to, —Cl, —Br, —$OR^7$, —$OCH_2CH_2OR^7$, $CH_3C(=O)O$—, $Et(Me)C=N$—O—, $CH_3C(=O)N(CH_3)$—, and —$ONH_2$, wherein $R^7$ is $C_1$ to $C_8$ hydrocarbyl or $C_1$ to $C_8$ halogen-substituted hydrocarbyl.

The hydrocarbyl and halogen-substituted hydrocarbyl groups represented by $R^7$ typically have from 1 to 8 carbon atoms, alternatively from 3 to 6 carbon atoms. Acyclic hydrocarbyl and halogen-substituted hydrocarbyl groups containing at least 3 carbon atoms can have a branched or unbranched structure. Examples of hydrocarbyl groups represented by $R^7$ include, but are not limited to, unbranched and branched alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, and octyl; cycloalkyl, such as cyclopentyl, cyclohexyl, and methylcyclohexyl; phenyl; alkaryl, such as tolyl and xylyl; aralkyl, such as benzyl and phenethyl; alkenyl, such as vinyl, allyl, and propenyl; arylalkenyl, such as styryl; and alkynyl, such as ethynyl and propynyl. Examples of halogen-substituted hydrocarbyl groups represented by $R^7$ include, but are not limited to, 3,3,3-trifluoropropyl, 3-chloropropyl, chlorophenyl, and dichlorophenyl.

Typically, 1 to 30 mol %, or alternatively 1 to 15 mol % of the groups $R^6$ in the silicone resin are hydrogen, hydroxy, or a hydrolysable group. As used herein, the mol % of groups in $R^6$ is defined as a ratio of the number of moles of silicon-bonded groups in the condensation curable silicone resin ($A^1$) to the total number of moles of the $R^6$ groups in the condensation curable silicone resin ($A^1$), multiplied by 100.

Examples of condensation curable silicone resins ($A^1$) include, but are not limited to, silicone resins having the following formulae:

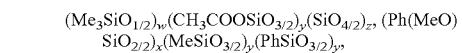

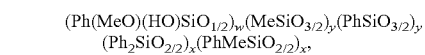

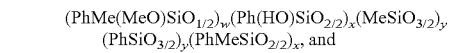

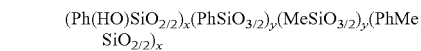

wherein Me is methyl, Ph is phenyl, wherein w, x, y, and z are as defined above, and the subscript y has a value such that the silicone resin has a number-average molecular weight of from 500 to 50,000. The sequence of units in the preceding formulae is not to be viewed in any way as limiting to the scope of the invention.

Specific examples of condensation curable silicone resins ($A^1$) include, but are not limited to, silicone resins having the following formulae:

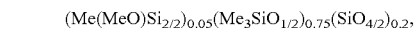

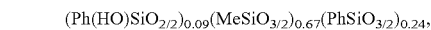

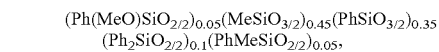

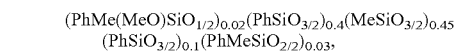

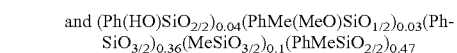

wherein Me is methyl, Ph is phenyl, the numerical subscripts outside the parenthesis denote mole fractions. The sequence of units in the preceding formulae is not to be viewed in any way as limiting to the scope of the invention. These formulae represent the fully condensed composition of these resins.

As set forth above, the condensation curable silicone resin ($A^1$) represented by formula (V) typically has a number-average molecular weight ($M_n$) of from 500 to 50,000. Alternatively, the condensation curable silicone resin ($A^1$) may have a $M_n$ of from 500 to 10,000, alternatively 800 to 3,000, where the molecular weight is determined by gel permeation chromatography employing a refractive index detector and silicone resin (MQ) standards.

The viscosity of the condensation curable silicone resin ($A^1$) at 25° C. is typically from 0.01 Pa·s to a solid, alternatively from 0.1 to 10,000 Pa·s, alternatively from 1 to 100 Pa·s. The condensation curable silicone resin ($A^1$) represented by formula (V) typically includes less than 10% (w/w), alternatively less than 5% (w/w), alternatively less than 2% (w/w), of silicon-bonded hydroxy groups, as determined by $^{29}$Si NMR.

Methods of preparing condensation curable silicone resins ($A^1$) represented by formula (V) are well known in the art; many of these resins are commercially available. Condensation curable silicone resins ($A^1$) represented by formula (V) are typically prepared by cohydrolyzing the appropriate mixture of chlorosilane precursors in an organic solvent, such as toluene. For example, a silicone resin including $R^1R^6{}_2SiO_{1/2}$ units and $R^1SiO_{3/2}$ units can be prepared by cohydrolyzing a first compound having the formula $R^1R^6{}_2SiCl$ and a second compound having the formula $R^1SiCl_3$ in toluene, where $R^1$ and $R^6$ are as defined and exemplified above. The cohydrolyzing process is described above in terms of the silicone composition comprising at least one hydrosilylation curable silicone resin.

In another embodiment, the condensation curable silicone resin ($A^1$) can be a rubber-modified silicone resin prepared by reacting an organosilicon compound selected from (i) a silicone resin having the formula $(R^1R^6{}_2SiO_{1/2})_w(R^6{}_2SiO_{2/2})_x(R^6SiO_{3/2})_y(SiO_{4/2})_z$ and (ii) hydrolysable precursors of (i), and (iii) a silicone rubber having the formula $R^8{}_3SiO(R^1R^8SiO)_mSiR^8{}_3$ in the presence of water, (iv) a condensation catalyst, and (v) an organic solvent, wherein $R^1$ and $R^6$ are as defined and exemplified above, $R^8$ is $R^1$ or a hydrolysable group, m is from 2 to 1,000, alternatively from 4 to 500, alternatively from 8 to 400, and w, x, y, and z are as defined and exemplified above, and silicone resin (i) has an average of at least two silicon-bonded hydroxy or hydrolysable groups per molecule, the silicone rubber (iii) has an average of at least two silicon-bonded hydrolysable groups per molecule, and the mole ratio of silicon-bonded hydrolysable groups in the silicone rubber (iii) to silicon-bonded hydroxy or hydrolysable groups in the silicone resin (i) is from 0.01 to 1.5, alternatively from 0.05 to 0.8, alternatively from 0.2 to 0.5. Typically, 1 mol % to 30 mol %, or alternatively 1 to 15 mol % of the groups $R^6$ in the silicone resin are hydrogen, hydroxy, or a hydrolysable group.

The silicone resin (i) typically has a number-average molecular weight ($M_n$) of from 500 to 50,000, alternatively from 500 to 10,000, alternatively 800 to 3,000, where the molecular weight is determined by gel permeation chromatography employing a refractive index detector and silicone resin (MQ) standards.

Specific examples of silicone resins suitable for use as silicone resin (i) include, but are not limited to, resins having the following formulae:

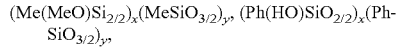

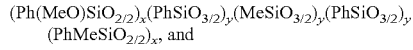

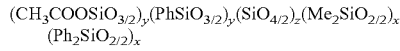

where Me is methyl, Ph is phenyl, where x, y, and z are as defined above, and the subscript y has a value such that the silicone resin has a number-average molecular weight of from 500 to 50,000. The sequence of units in the preceding formulae is not to be viewed in any way as limiting to the scope of the invention.

Specific examples of silicone resins suitable for use as silicone resin (i) include, but are not limited to, resins having the following formulae:

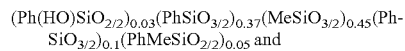

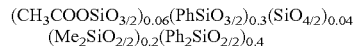

where Me is methyl, Ph is phenyl, the numerical subscripts outside the parenthesis denote mole fractions. The sequence of units in the preceding formulae is not to be viewed in any way as limiting to the scope of the invention. Silicone resin (i) can be a single silicone resin or a mixture comprising two or more different silicone resins, each having the specified formula. Silicone resin (i) can be a single silicone resin or a mixture comprising two or more different silicone resins, each having the specified formula.

As used herein, the term "hydrolysable precursors" refers to silanes having hydrolysable groups that are suitable for use as starting materials (precursors) for preparation of the silicone resin (i). The hydrolysable precursors (ii) can be represented by the formulae $R^1R^8{}_2SiX$, $R^8{}_2SiX_2$, $R^8SiX_3$, and $SiX_4$, wherein $R^1$, $R^8$, and X are as defined and exemplified above.

Specific examples of hydrolysable precursors (ii) include, but are not limited to, silanes having the formulae: $Me_2ViSiCl$, $Me_3SiCl$, $MeSi(OEt)_3$, $PhSiCl_3$, $MeSiCl_3$, $Me_2SiCl_2$, $PhMeSiCl_2$, $SiCl_4$, $Ph_2SiCl_2$, $PhSi(OMe)_3$, $MeSi(OMe)_3$, $PhMeSi(OMe)_2$, and $Si(OEt)_4$, wherein Me is methyl, Et is ethyl, and Ph is phenyl.

Specific examples of silicone rubbers (iii) include, but are not limited to, silicone rubbers having the following formulae:

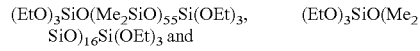

wherein Me is methyl and Et is ethyl.

The reaction is typically carried out at a temperature of from room temperature (~23±2° C.) to 180° C., alternatively from room temperature to 100° C. The reaction time depends on several factors, including the structures of the silicone resin (i) and the silicone rubber (iii), and the temperature. The components are typically allowed to react for a period of time sufficient to complete the condensation reaction. This means the components are allowed to react until at least 40 mol %, alternatively at least 65 mol %, alternatively at least 90 mol %, of the silicon-bonded hydrolysable groups originally present in the silicone rubber (iii) have been consumed in the condensation reaction, as determined by $^{29}$Si NMR spectrometry. The time of reaction is typically from 1 to 30 h at a temperature of from room temperature (~23±2° C.) to 100° C. The optimum reaction time can be determined by routine experimentation.

Suitable condensation catalysts (iv) are described in further detail below, and suitable organic solvents (v) are described above in the context of rubber-modified silicone resin (A') above. The concentration of the condensation catalyst (iv) is sufficient to catalyze the condensation reaction of the silicone resin (i) with the silicone rubber (iii). Typically, the concentration of the condensation catalyst (iv) is from 0.01 to 5% (w/w), alternatively from 0.01 to 3% (w/w), alternatively from 0.05 to 2.5% (w/w), based on the weight of the silicon resin (i). The concentration of the organic solvent (v) is typically from 10 to 95% (w/w), alternatively from 20 to 85% (w/w), alternatively from 50 to 80% (w/w), based on the total weight of the reaction mixture.

The concentration of water in the reaction mixture depends on the nature of the groups $R^8$ in the organosilicon compound and the nature of the silicon-bonded hydrolysable groups in the silicone rubber. When the silicone resin (i) contains hydrolysable groups, the concentration of water is sufficient to effect hydrolysis of the hydrolysable groups in the silicon resin (i) and the silicone rubber (iii). For example, the concentration of water is typically from 0.01 to 3 moles, alternatively from 0.05 to 1 moles, per mole of hydrolysable group in the silicone resin (i) and the silicone rubber (iii) combined. When the silicone resin (i) does not contain hydrolysable groups, only a trace amount, e.g., 100 ppm, of water is required in the reaction mixture. Trace amounts of water are normally present in the reactants and/or solvent.

As set forth above, the silicone composition comprising at least one condensation curable silicone resin can further comprise the cross-linking agent ($B^1$). The cross-linking agent ($B^1$) can have the formula $R^7_q SiX_{4-q}$, wherein $R^7$ is $C_1$ to $C_8$ hydrocarbyl or $C_1$ to $C_8$ halogen-substituted hydrocarbyl, X is a hydrolysable group, and q is 0 or 1. The hydrocarbyl and halogen-substituted hydrocarbyl groups represented by $R^7$, and the hydrolysable groups represented by X are as described and exemplified above.

Specific examples of cross-linking agents ($B^1$) include, but are not limited to, alkoxy silanes such as $MeSi(OCH_3)_3$, $CH_3Si(OCH_2CH_3)_3$, $CH_3Si(OCH_2CH_2CH_3)_3$, $CH_3Si[O(CH_2)_3CH_3]_3$, $CH_3CH_2Si(OCH_2CH_3)_3$, $C_6H_5Si(OCH_3)_3$, $C_6H_5CH_2Si(OCH_3)_3$, $C_6H_5Si(OCH_2CH_3)_3$, $CH_2=CHSi(OCH_3)_3$, $CH_2=CHCH_2Si(OCH_3)_3$, $CF_3CH_2CH_2Si(OCH_3)_3$, $CH_3Si(OCH_2CH_2OCH_3)_3$, $CF_3CH_2CH_2Si(OCH_2CH_2OCH_3)_3$, $CH_2=CHSi(OCH_2CH_2OCH_3)_3$, $CH_2=CHCH_2Si(OCH_2CH_2OCH_3)_3$, $C_6H_5Si(OCH_2CH_2OCH_3)_3$, $Si(OCH_3)_4$, $Si(OC_2H_5)_4$, and $Si(OC_3H_7)_4$; organoacetoxysilanes such as $CH_3Si(OCOCH_3)_3$, $CH_3CH_2Si(OCOCH_3)_3$, and $CH_2=CHSi(OCOCH_3)_3$; organoiminooxysilanes such as $CH_3Si[O—N=C(CH_3)CH_2CH_3]_3$, $Si[O—N=C(CH_3)CH_2CH_3]_4$, and $CH_2=CHSi[O—N=C(CH_3)CH_2CH_3]_3$; organoacetamidosilanes such as $CH_3Si[NHC(=O)CH_3]_3$ and $C_6H_5Si[NHC(=O)CH_3]_3$; amino silanes such as $CH_3Si[NH(s-C_4H_9)]_3$ and $CH_3Si(NHC_6H_{11})_3$; and organoaminooxysilanes.

The cross-linking agent ($B^1$) can be a single silane or a mixture of two or more different silanes, each as described above. Also, methods of preparing tri- and tetra-functional silanes are well known in the art; many of these silanes are commercially available.

When present, the concentration of the cross-linking agent ($B^1$) in the silicone composition is sufficient to cure (cross-link) the condensation-curable silicone resin. The exact amount of the cross-linking agent ($B^1$) depends on the desired extent of cure, which generally increases as the ratio of the number of moles of silicon-bonded hydrolysable groups in the cross-linking agent ($B^1$) to the number of moles of silicon-bonded hydrogen atoms, hydroxy groups, or hydrolysable groups in the condensation curable silicone resin ($A^1$) increases. Typically, the concentration of the cross-linking agent ($B^1$) is sufficient to provide from 0.2 to 4 moles of silicon-bonded hydrolysable groups per mole of silicon-bonded hydrogen atoms, hydroxy groups, or hydrolysable groups in the condensation curable silicone resin ($A^1$). The optimum amount of the cross-linking agent ($B^1$) can be readily determined by routine experimentation.

Condensation catalyst ($C^1$) can be any condensation catalyst typically used to promote condensation of silicon-bonded hydroxy (silanol) groups to form Si—O—Si linkages. Examples of condensation catalysts include, but are not limited to, amines; and complexes of lead, tin, zinc, and iron with carboxylic acids. In particular, the condensation catalyst ($C^1$) can be selected from tin(II) and tin(IV) compounds such as tin dilaurate, tin dioctoate, and tetrabutyl tin; and titanium compounds such as titanium tetrabutoxide.

When present, the concentration of the condensation catalyst ($C^1$) is typically from 0.1 to 10% (w/w), alternatively from 0.5 to 5% (w/w), alternatively from 1 to 3% (w/w), based on the total weight of the condensation curable silicone resin ($A^1$).

When the silicone composition includes condensation catalyst ($C^1$), the silicone composition is typically a two-part composition where the condensation curable silicone resin ($A^1$) and condensation catalyst ($C^1$) are in separate parts.

The silicone compositions comprising at least one condensation curable silicone resin of this invention can comprise additional ingredients, as known in the art and as described above for the hydrosilylation cured silicone resin compositions.

In yet another embodiment, the coating layer can also comprise a free radical cured silicone resin composition. The free radical cured silicone resin composition comprises a cured product of a silicone composition comprising ($A^2$) a free radical curable silicone resin, optionally ($B^2$) a cross-linking agent, and optionally ($C^2$) a free radical initiator (a free radical photoinitiator or organic peroxide). This cured product can be obtained by a method comprising curing a silicone composition comprising ($A^2$), optionally (B2), and optionally ($C^2$).

The silicone resin ($A^2$) can be any silicone resin that can be cured (i.e., cross-linked) by at least one method selected from (i) exposing the silicone resin to radiation having a wavelength of from 150 to 800 nm in the presence of a free radical photoinitiator, (ii) heating the silicone resin ($A^4$) in the presence of an organic peroxide, and (iii) exposing the silicone resin ($A''''$) to an electron beam. The silicone resin ($A^2$) is typically a copolymer containing T siloxane units and/or Q siloxane units in combination with M and/or D siloxane units.

For example, the silicone resin ($A^2$) may have the formula

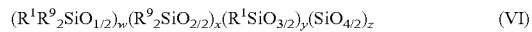  (VI)

wherein $R^1$ is as defined and exemplified above, $R^9$ is $R^1$, alkenyl, or alkynyl, and w, x, y, and z are as defined and exemplified above.

The alkenyl groups represented by $R^9$, which may be the same or different, are as defined and exemplified in the description of $R^2$ above.

The alkynyl groups represented by $R^9$, which may be the same or different, typically have from 2 to about 10 carbon atoms, alternatively from 2 to 6 carbon atoms, and are exemplified by, but not limited to, ethynyl, propynyl, butynyl, hexynyl, and octynyl.

The silicone resin ($A^2$) typically has a number-average molecular weight ($M_n$) of from 500 to 50,000, alternatively from 500 to 10,000, alternatively 1,000 to 3,000, where the molecular weight is determined by gel permeation chromatography employing a refractive index detector and silicone resin (MQ) standards.

The silicone resin ($A^2$) typically contains less than 10% (w/w), alternatively less than 5% (w/w), alternatively less than 2% (w/w), of silicon-bonded hydroxy groups, as determined by $^{29}Si$ NMR.

Examples of silicone resins (A²) that are suitable for purposes of the present invention include, but are not limited to, silicone resins having the following formulae:

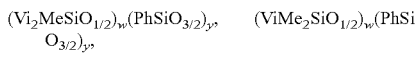

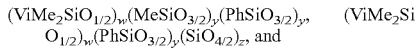

wherein Me is methyl, Vi is vinyl, Ph is phenyl, and w, y, and z are as defined above. The sequence of units in the preceding formulae is not to be viewed in any way as limiting to the scope of the invention. Specific examples of these silicone resins are silicone resins having the following formulae:

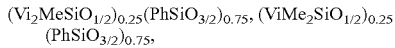

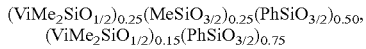

wherein Me is methyl, Vi is vinyl, Ph is phenyl, and the numerical subscripts outside the parenthesis denote mole fractions. The sequence of units in the preceding formulae is not to be viewed in any way as limiting to the scope of the invention.

The crosslinking agent (B²) is exemplified by an unsaturated compound selected from (i) at least one organosilicon compound having at least one silicon-bonded alkenyl group per molecule, (ii) at least one organic compound having at least one aliphatic carbon-carbon double bond per molecule, or (iii) mixtures comprising (i) and (ii), wherein the unsaturated compound has a molecular weight less than 500. Alternatively, the unsaturated compound has a molecular weight less than 400 or less than 300. Also, the unsaturated compound can have a linear, branched, or cyclic structure.

The organosilicon compound (i) can be an organosilane or an organosiloxane. The organosilane can be a monosilane, disilane, trisilane, or polysilane. Similarly, the organosiloxane can be a disiloxane, trisiloxane, or polysiloxane. Cyclosilanes and cyclosiloxanes typically have from 3 to 12 silicon atoms, alternatively from 3 to 10 silicon atoms, alternatively from 3 to 4 silicon atoms. In acyclic polysilanes and polysiloxanes, the silicon-bonded alkenyl group(s) can be located at terminal, pendant, or at both terminal and pendant positions.

Specific examples of organosilanes include, but are not limited to, silanes having the following formulae:

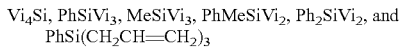

wherein Me is methyl, Ph is phenyl, and Vi is vinyl.

Specific examples of organosiloxanes include, but are not limited to, siloxanes having the following formulae:

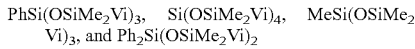

wherein Me is methyl, Vi is vinyl, and Ph is phenyl.

The organic compound (II) can be any organic compound containing at least one aliphatic carbon-carbon double bond per molecule, provided the compound does not prevent the silicone resin (A²) from curing to form a silicone resin film. The organic compound (II) can be an alkene, a diene, a triene, or a polyene. Further, in acyclic organic compounds, the carbon-carbon double bond(s) can be located at terminal, pendant, or at both terminal and pendant positions.

The organic compound (II) can contain one or more functional groups other than the aliphatic carbon-carbon double bond. Examples of suitable functional groups include, but are not limited to, —O—, >C═O, —CHO, —CO₂—, —C≡N, —NO₂, >C═C<, —C≡C—, —F, —Cl, —Br, and —I. The suitability of a particular unsaturated organic compound for use in the silicone composition comprising at least one free radical curable silicone resin of the present invention can be readily determined by routine experimentation.

The organic compound (II) can have a liquid or solid state at room temperature. Also, the organic compound can be soluble, partially soluble, or insoluble in the silicone composition. The normal boiling point of the organic compound, which depends on the molecular weight, structure, and number and nature of functional groups in the compound, can vary over a wide range. Preferably, the organic compound has a normal boiling point greater than the cure temperature of the composition. Otherwise, appreciable amounts of the organic compound may be removed by volatilization during cure.

Examples of organic compounds (II) containing aliphatic carbon-carbon double bonds include, but are not limited to, 1,4-divinylbenzene, 1,3-hexadienylbenzene, and 1,2-diethenylcyclobutane.

The unsaturated compound can be a single unsaturated compound or a mixture comprising two or more different unsaturated compounds, each as described above. For example, the unsaturated compound can be a single organosilane, a mixture of two different organosilanes, a single organosiloxane, a mixture of two different organosiloxanes, a mixture of an organosilane and an organosiloxane, a single organic compound, a mixture of two different organic compounds, a mixture of an organosilane and an organic compound, or a mixture of an organosiloxane and an organic compound.

The concentration of crosslinking agent (B²) is typically from 0 to 70% (w/w), alternatively from 10 to 50% (w/w), alternatively from 20 to 40% (w/w), based on the total weight of the silicone composition.

Methods of preparing organosilanes and organosiloxanes containing silicon-bonded alkenyl groups, and organic compounds containing aliphatic carbon-carbon double bonds are well known in the art; many of these compounds are commercially available.

The free radical initiator (C²) is typically a free radical photoinitiator or an organic peroxide. Further, the free radical photoinitiator can be any free radical photoinitiator capable of initiating cure (cross-linking) of the silicone resin upon exposure to radiation having a wavelength of from 200 to 800 nm.

Examples of free radical photoinitiators (C²) include, but are not limited to, benzophenone; 4,4'-bis(dimethylamino) benzophenone; halogenated benzophenones; acetophenone; α-hydroxyacetophenone; chloro acetophenones, such as dichloroacetophenones and trichloroacetophenones; dialkoxyacetophenones, such as 2,2-diethoxyacetophenone; α-hydroxyalkylphenones, such as 2-hydroxy-2-methyl-1-phenyl-1-propanone and 1-hydroxycyclohexyl phenyl ketone; α-aminoalkylphenones, such as 2-methyl-4'-(methylthio)-2-morpholiniopropiophenone; benzoin; benzoin ethers, such as benzoin methyl ether, benzoin ethyl ether, and benzoin isobutyl ether; benzil ketals, such as 2,2-dimethoxy-2-phenylacetophenone; acylphosphinoxides, such as diphenyl(2,4,6-trimethylbenzoyl)phosphine oxide; xanthone derivatives; thioxanthone derivatives; fluorenone derivatives; methyl phenyl glyoxylate; acetonaphthone; anthraquinone derivatives; sulfonyl chlorides of aromatic compounds; and O-acyl α-oximinoketones, such as 1-phenyl-1,2-propanedione-2-(O-ethoxycarbonyl)oxime.

The free radical photoinitiator ($C^2$) can also be a polysilane, such as the phenylmethylpolysilanes defined by West in U.S. Pat. No. 4,260,780, the disclosure of which as it relates to the phenylmethylpolysilanes is hereby incorporated by reference; the aminated methylpolysilanes defined by Baney et al. in U.S. Pat. No. 4,314,956, the disclosure of which is hereby incorporated by reference as it relates to aminated methylpolysilanes; the methylpolysilanes of Peterson et al. in U.S. Pat. No. 4,276,424, the disclosure of which is hereby incorporated by reference as it relates to methylpolysilanes; and the polysilastyrene defined by West et al. in U.S. Pat. No. 4,324,901, the disclosure of which is hereby incorporated by reference as it relates to polysilastyrene.

The free radical photoinitiator can be a single free radical photoinitiator or a mixture comprising two or more different free radical photoinitiators. The concentration of the free radical photoinitiator is typically from 0.1 to 6% (w/w), alternatively from 1 to 3% (w/w), based on the weight of the silicone resin ($A^2$).

The free radical initiator can also be an organic peroxide. Examples of organic peroxides include, diaroyl peroxides such as dibenzoyl peroxide, di-p-chlorobenzoyl peroxide, and bis-2,4-dichlorobenzoyl peroxide; dialkyl peroxides such as di-t-butyl peroxide and 2,5-dimethyl-2,5-di-(t-butylperoxy)hexane; diaralkyl peroxides such as dicumyl peroxide; alkyl aralkyl peroxides such as t-butyl cumyl peroxide and 1,4-bis(t-butylperoxyisopropyl)benzene; and alkyl aroyl peroxides such as t-butyl perbenzoate, t-butyl peracetate, and t-butyl peroctoate.

The organic peroxide can be a single peroxide or a mixture comprising two or more different organic peroxides. The concentration of the organic peroxide is typically from 0.1 to 5% (w/w), alternatively from 0.2 to 2% (w/w), based on the weight of the silicone resin ($A^4$).

The silicone composition comprising silicone resin ($A^2$) can further comprise at least one organic solvent. The organic solvent can be any aprotic or dipolar aprotic organic solvent that does not react with the silicone resin ($A^2$) or additional ingredient(s) and is miscible with the silicone resin ($A^2$). Examples of organic solvents include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; and halogenated aromatic hydrocarbons such as bromobenzene and chlorobenzene. The organic solvent can be a single organic solvent or a mixture comprising two or more different organic solvents, each as described above.

The concentration of the organic solvent is typically from 0 to 99% (w/w), alternatively from 30 to 80% (w/w), alternatively from 45 to 60% (w/w), based on the total weight of the silicone composition comprising silicone resin ($A^2$).

The silicone compositions comprising free radical curable silicone resin ($A^2$) of this invention can comprise additional ingredients including, but are not limited to, silicone rubbers; unsaturated compounds; free radical initiators; organic solvents; UV stabilizers; sensitizers; dyes; flame retardants; antioxidants; fillers, such as reinforcing fillers, extending fillers, and conductive fillers; and adhesion promoters.

When the silicone compositions comprising free radical curable silicone resin ($A^2$) of this invention described above contain one or more additional ingredients, for example, a free radical initiator, the composition can be a one-part composition comprising the silicone resin and optional ingredient(s) in a single part, or a multi-part composition comprising the components in two or more parts.

Application of the silicone compositions or cured silicone resin compositions described above to the glass substrate can be any commonly used methods of applying a coating to a solid substrate such as spin coating, knife-coating, flow-coating, spraying, laminating, brushing, painting, casting, dip coating, rod coating, blade coating, air knife coating, gravure coating, forward and reverse roll coating, slot and extrusion coating, slide coating and curtain coating. As cited above the silicone composition can be coated onto the glass substrate before curing or after the silicone composition has been cured.

At least a portion of the glass substrate must be coated with the cured silicone resin compositions described above, however typically a homogenous blend of the cured silicone resin composition is applied to the glass substrate such that a uniform layer of the cured silicone resin composition is distributed on top of the glass substrate and typically all of the available surface of the glass substrate is coated with the cured silicone resin composition. It is also contemplated by the present invention that both sides of the glass substrate can be coated with the cured silicone resin composition(s) described above. The cured silicone resin composition on the glass substrate typically has a thickness from 0.010 μm to 20 μm, alternatively from 0.050 μm to 10 μm, alternatively from 0.100 μm to 5 μm.

The coating layer comprising the above described cured silicone resin composition can also alternatively be adhered to the glass substrate using any conventional adhesives which are useful in bonding coatings to solid substrates.

In another embodiment of this invention, the article of manufacture can further comprise one or more additional glass substrates, or in other words, the cured silicone resin compositions of this invention can act as an interlayer between two or more glass substrates. Thus, in monolithic instances, the coated article includes only one glass substrate. Monolithically coated articles herein may be used in devices such as window units and the like. A laminated vehicle windshield typically includes first and second glass substrates containing a cured silicone resin composition interlayer. One of these substrates of the laminate may support the cured silicone resin composition described above on an interior surface thereof in certain embodiments. As for window units, a window unit may include two or more spaced apart glass substrates. An example window unit may include, for example, a coated glass substrate coupled to another glass substrate with the gap therebetween filled with the coating layer comprising the cured silicone resin composition described above. Another example window unit may comprise two or more spaced apart clear glass substrates one of which is coated with the cured silicone resin composition herein in certain example instances, where the gap between the glass substrates may be from about 0.030 to 500 mm, or alternatively from about 0.040 to 0.500 mm. In certain embodiments, the cured silicone resin composition may be provided on the interior surface of either glass substrate facing the gap. Thus it is contemplated by the present invention that the article or manufacture can comprise a multi-layer construction comprising alternating glass substrate layers with the above described coating layer comprising the cured silicone resin composition sandwiched in-between.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention. All percentages are in weight percent.

EXAMPLES

Preparation of Silicone Composition A

Trimethoxyphenylsilane (200 g), tetramethyldivinyldisiloxane (38.7 g), deionized water (65.5 g), toluene (256 g), and trifluoromethanesulfonic acid (1.7 g) were combined in a 3-neck, round-bottom flask equipped with a Dean-Stark Trap and thermometer. The mixture was heated at 60 to 65° C. for 2 hours. The mixture was then heated to reflux and water and methanol were removed using a Dean-Stark trap. When the temperature of the mixture reached 80° C. and the removal of water and methanol was complete, the mixture was cooled to less than 50° C. Calcium carbonate (3.3 g) and water (about 1 g) were added to the mixture. The mixture was stirred at room temperature for 2 hours and then potassium hydroxide (0.17 g) was added to the mixture. The mixture was then heated to reflux and water was removed using a Dean-Stark trap. When the reaction temperature reached 120° C. and the removal of water was complete, the mixture was cooled to less than 40° C. Chlorodimethylvinylsilane (0.37 g) was added to the mixture and mixing was continued at room temperature for 1 hour. The mixture was filtered to give a solution of a hydrosilylation curable silicone resin having the formula $(PhSiO_{3/2})_{0.75}(ViMe_2SiO_{1/2})_{0.25}$ in toluene. The resin has a weight-average molecular weight of about 1700, has a number-average molecular weight of about 1440, and contains about 1 mole percent of silicon-bonded hydroxy groups. The volume of the solution was adjusted to produce a solution containing 79.5 percent by weight of the silicone resin in toluene. The resin concentration of a solution was determined by measuring the weight loss after drying a sample (2.0 g) of the solution in an oven at 150° C. for 1.5 hours.

The hydrosilylation curable silicone resin prepared above was mixed with 1,4-bis(dimethylsilyl)benzene, the relative amounts of the two ingredients sufficient to achieve a mole ratio of silicon-bonded hydrogen atoms to silicon-bonded vinyl groups (SiH/SiVi) of 1.1:1, as determined by $^{29}$Si NMR and $^{13}$C NMR. The mixture was heated at 80° C. under a pressure of 5 mmHg (667 Pa) to remove the toluene. Then, a small amount of 1,4-bis(dimethylsilyl)benzene was added to the mixture to restore the mole ratio SiH/SiVi to 1.1:1. To the mixture was added 0.5% w/w, based on the weight of the resin, of a platinum catalyst containing 1000 ppm of platinum. The catalyst was prepared by treating a platinum(0) complex of 1,1,3,3-tetramethyldisiloxane in the presence of a large molar excess of 1,1,3,3-tetramethyldisiloxane, with triphenylphosphine to achieve a mole ratio of triphenylphosphine to platinum of about 4:1.

Preparation of Silicone Composition B: this Silicone Composition was Produced by co-hydrolyzing a mixture of 40 mole percent of phenyltrichlorosilane, 45 mole percent of methyltrichlorosilane, 10 mole percent of diphenyldichlorosilane, and 5 mole percent of phenylmethyldichlorosilane in toluene and an excess amount of water, washing the toluene phase with deionized water to remove hydrogen chloride, and condensing the toluene solution under heat. The condensation curable silicone resin was flaked to produce a soluble solid that had a Mn of 1410 and a Mw/Mn value of 1.805, as determined by GPC using polystyrene standards.

Example 1

0211 Microglass® sheets, 70 to 80 micrometers thick, were obtained from Corning Incorporated as three inch long and one and half inch wide rectangles. 2.2 g of Silicone Composition B was dissolved in MIBK to make a 12 weight percent solution. The silicone composition was a phenyl methyl silicone resin with a number average molecular weight of about 1440 and approximately 2 weight percent SiOH content. The resin had the formula $(Ph(MeO)SiO_{2/2})_{0.05}(MeSiO_{3/2})_{0.45}(PhSiO_{3/2})_{0.35}(Ph_2SiO_{2/2})_{0.10}(PhMeSiO_{2/2})_{0.05}$ The solution was filtered through a 0.2 μm syringe filter. The filtered solution was spin coated onto the glass sheets using a spin speed of 2000 rpm and spinning time of 50 seconds. The coating was then placed in an air circulating oven to cure at 200° C. for 1 h. The coating and curing steps were repeated to coat the other side of the glass sheet. The thickness of the cured resin coating on both sides of the glass sheets was approximately 0.2 μm. The flexibility of the glass sheet was tested by bending the glass sheet along its longitudinal direction around a cylindrical rod of a certain diameter and recording the smallest diameter the glass sheet could tolerate without crack formation. The smaller the diameter of the cylindrical rod, the higher a strain the glass sheet was subjected to. To maintain consistency three glass sheets were tested for each diameter and only one crack in any one of the three specimens was needed to qualify the sheet as "cracked". Pristine glass sheets without coating were also tested at the same time to compare with the coated ones. The glass sheets were all bent so that half the perimeter of the cylindrical rod was wrapped. The flexibility of the glass sheets was determined as described in ASTM Standard D522-93a, Method B.

Test results were shown in Table 1. Silicone Composition B coated micro glass sheets showed measurable better flexibility. The 0.2 μm film coated one was able to be bent around a 1 inch diameter cylindrical rod without crack, while the uncoated one was only able to be bent around a 1.68 inch diameter rod.

Example 2

The Silicone Composition B as described above in Example 1 was spin coated onto the same glass sheets using a slower spinning speed to yield a high coating thickness. The spin coating speed was 1000 rpm and the spinning time was the same. A film roughly 1 μm thick was obtained. Again both sides were coated. The test result is included in Table 1. Improved flexibility of the glass sheet was observed.

TABLE 1

Smallest Diameter at which Micro Glass Sheets Did Not Crack

| Sample ID | Type | Coating Thickness | Diameter of Rod |
|---|---|---|---|
| Control | pristine glass sheet | None | 1.68 inch |
| Example 1 | Silicone Composition B | 0.2 μm both sides | 1.00 inch |
| Example 2 | Silicone Composition B | 1 μm both sides | 1.00 inch |

Example 3

A 10 μm thick cured coating of silicone composition A was applied onto the thin glass sheet as follows. Silicone Composition A was diluted with methylisobutylketone (MIBK) to 93 weight percent. The diluted resin was mixed with 5 ppm platinum in the form of its complex with divinyltetramethyldisiloxane. The catalyzed solution was spin coated onto the 70 micrometer thick glass sheet using the same coating conditions as for Example 1. The coated glass sheet was left in a fume hood to dry for three hours and moved to an air circulating oven to cure at 100° C. for 1 hour, then 160° C. for 1 hour, then 200° C. for 1 hour. After cure the other side of the glass sheet was also coated and cured similarly.

Example 4

Two regular window pane glass plates ³⁄₁₆" thick, 16" long, and 10" wide were obtained from a local hardware store, ACE Hardware. The glass plates were cleaned with soap water and dried. 100 g of Silicone Composition A was mixed with 0.5 g of the platinum catalyst described in the Preparation of Silicone Composition A hereinabove. A uniform layer of this composition was applied onto a glass plate using a bounded wire draw coating bar (#32). The coated glass plate was placed in a air circulating oven set at 80° C. for 10 minutes to partially cure the resin. The other glass plate was similarly prepared. The two coated and partially cured plates were then stacked up so the partially cured resin layers faced each other. The stack was then placed in an oven to cure with a slight pressure applied by a weight placed on the top through the following cycle: 5° C./min. to 100° C., 100° C./1 h., 5° C./min. to 160° C., 160° C./1 h., 5° C./min to 200° C., 200° C./1 h. The final cured laminate glass was substantially free of imperfections and was transparent.

Example 5

A laminate using four plies of glass was prepared using the two pieces of laminate prepared in Example 4. The same resin was applied to one side of the two laminates, partially cured, stacked, and cured in the same fashion as described in Example 5 to join the two laminates.

That which is claimed is:

1. An article of manufacture comprising (i) at least one glass substrate having a thickness of 5 to 500 micrometers and (ii) a coating layer on at least a portion of at least one side of the glass substrate wherein the coating layer comprises a cured silicone resin composition selected from:
   (I) a hydrosilylation cured silicone resin composition which is a cured product of a silicone composition comprising:
   (A) a silicone resin having the formula:

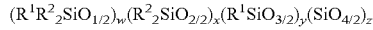

wherein $R^1$ is a $C_1$ to $C_{10}$ hydrocarbyl group or a $C_1$ to $C_{10}$ halogen-substituted hydrocarbyl group, both free of aliphatic unsaturation, $R^2$ is $R^1$ or an alkenyl group, w has a value of from 0 to 0.8, x has a value of from 0 to 0.6, y has a value of from 0 to 0.99, z has a value of from 0 to 0.35, the sum of y+z is 0.2 to 0.99, and the sum of w+x is 0.01 to 0.80 with the proviso that silicone resin (A) contains at least two silicon-bonded alkenyl groups per molecule;
   (B) a organohydrogensilane or organohydrogensiloxane containing at least two silicon bonded hydrogen atoms per molecule;
   (C) a hydrosilylation catalyst selected from complexes of chloroplatinic acid and vinyl-containing organosiloxanes, a supported hydrosilylation catalyst comprising a solid support having a platinum group metal on the surface thereof, or a microencapsulated platinum group metal-containing catalyst comprising a platinum group metal encapsulated in a thermoplastic resin; and optionally a hydrosilylation catalyst inhibitor; or
   (II) a free radical cured silicone resin composition which is a cured product of a silicone composition comprising:
   ($A^2$) a free radical curable silicone resin having the formula

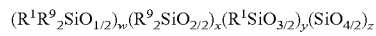

wherein $R^1$ is a $C_1$ to $C_{10}$ hydrocarbyl group or a $C_1$ to $C_{10}$ halogen-substituted hydrocarbyl group, both free of aliphatic unsaturation, $R^9$ is $R^1$, alkenyl, or alkynyl, w has a value of from 0 to 0.8, x has a value of from 0 to 0.6, y has a value of from 0 to 0.99, z has a value of from 0 to 0.35, the sum of y+z is 0.2 to 0.99, and the sum of w+x is 0.01 to 0.80, with the proviso that silicone resin ($A^2$) has an average of at least two silicon-alkenyl groups or at least two silicon-bonded alkynyl groups per molecule;
   ($B^2$) a crosslinking agent which is an unsaturated compound having a molecular weight of less than 500 selected from (i) at least one organosilicon compound having at least one silicon-bonded alkenyl group per molecule, (ii) at least one organic compound having at least one aliphatic carbon-carbon double bond per molecule, or (iii) mixtures comprising (i) and (ii);
   ($C^2$) a free radical photoinitiator or an organic peroxide.

2. An article of manufacture according to claim 1, wherein the glass substrate has a thickness of 5 to 150 micrometers.

3. An article of manufacture according to claim 1, wherein the coating layer (ii) is the hydrosilylation cured silicone resin composition (I) and wherein
   (A) is $(ViMe_2SiO_{1/2})_w(PhSiO_{3/2})_y$, $(ViMe_2SiO_{1/2})_w(MeSiO_{3/2})_{y1}(PhSiO_{3/2})_{y2}$, $(ViMe_2SiO_{1/2})_w(PhSiO_{3/2})_y(SiO_{4/2})_z$, or $(Vi_2MeSiO_{1/2})_{w1}(ViMe_2SiO_{1/2})_{w2}(PhSiO_{3/2})_y$
   wherein Me is methyl, Vi is vinyl, Ph is phenyl; w, w1, and w2 each has a value of 0.05 to 0.3; y, y1, and y2 each has a value of 0.5 to 0.8; and z has a value of 0 to 0.15; and
   (B) is an organohydrogensilane having the formula:

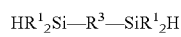

wherein $R^1$ is a $C_1$ to $C_{10}$ hydrocarbyl group or a $C_1$ to $C_{10}$ halogen-substituted hydrocarbyl group, both free of aliphatic unsaturation, and $R^3$ is a hydrocarbylene group free of aliphatic unsaturation.

4. An article of manufacture according to claim 3, wherein (B) is

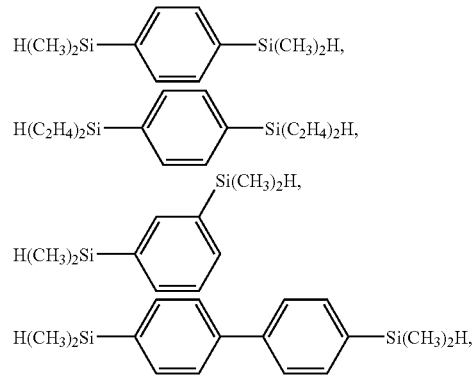

-continued

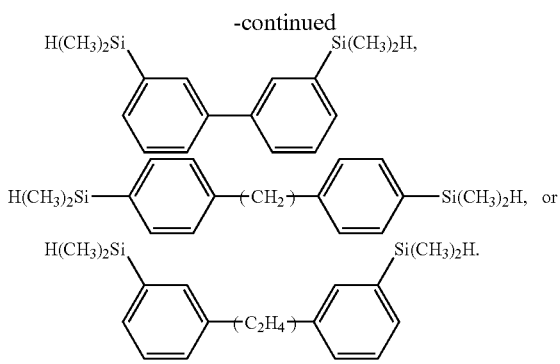

5. An article of manufacture according to claim 1, wherein the coating layer (ii) is the free radical cured silicone resin composition (II) and wherein
($A^2$) is $(Vi_2MeSiO_{1/2})_w(PhSiO_{3/2})_y$, $(ViMe_2SiO_{1/2})_w(PhSiO_{3/2})_y$, $(ViMe_2SiO_{1/2})_w(MeSiO_{3/2})_{y1}(PhSiO_{3/2})_{y2}$, $(ViMe_2SiO_{1/2})_w(PhSiO_{3/2})_y(SiO_{4/2})_z$, and $(Vi_2MeSiO_{1/2})_{w1}(ViMe_2SiO_{1/2})_{w2}(PhSiO_{3/2})_y$,
wherein Me is methyl, Vi is vinyl, Ph is phenyl; w, w1, and w2 each has a value of 0.05 to 0.3; y, y1, and y2 each has a value of 0.5 to 0.8; and z has a value of 0 to 0.15; and
($B^2$) is selected from
(i) $Vi_4Si$, $PhSiVi_3$, $MeSiVi_3$, $PhMeSiVi_2$, $Ph_2SiVi_2$, and $PhSi(CH_2CH=CH_2)_3$, $PhSi(OSiMe_2Vi)_3$, $Si(OSiMe_2Vi)_4$, $MeSi(OSiMe_2Vi)_3$, and $Ph_2Si(OSiMe_2Vi)_2$ wherein Me is methyl, Vi is vinyl, and Ph is phenyl,
(ii) 1,4-divinylbenzene, 1,3-hexadienylbenzene, and 1,2-diethenylcyclobutane, or mixtures of (i) and (ii).

6. An article of manufacture comprising (i) at least one glass substrate having a thickness of 5 to 500 micrometers and (ii) a coating layer on at least a portion of at least one side of the glass substrate wherein the coating layer comprises a cured silicone resin composition selected from:
(I) a hydrosilylation cured silicone resin composition which is a cured product of a silicone composition comprising:
(A) a silicone resin having the formula:

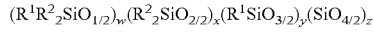

wherein $R^1$ is a $C_1$ to $C_{10}$ hydrocarbyl group or a $C_1$ to $C_{10}$ halogen-substituted hydrocarbyl group, both free of aliphatic unsaturation, $R^2$ is $R^1$ or an alkenyl group, w has a value of from 0 to 0.8, x has a value of from 0 to 0.6, y has a value of from 0 to 0.99, z has a value of from 0 to 0.35, the sum of y+z is 0.2 to 0.99, and the sum of w+x is 0.01 to 0.80 with the proviso that silicone resin (A) contains at least two silicon-bonded alkenyl groups per molecule;
(B) a organohydrogensilane or organohydrogensiloxane containing at least two silicon bonded hydrogen atoms per molecule;
(C) a hydrosilylation catalyst; and optionally a hydrosilylation catalyst inhibitor;
(II) a condensation cured silicone resin composition which is a cured product of a silicone composition comprising:
($A^1$) is a silicone resin having the formula:

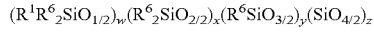

wherein $R^1$ is a $C_1$ to $C_{10}$ hydrocarbyl group or a $C_1$ to $C_{10}$ halogen-substituted hydrocarbyl group, both free of aliphatic unsaturation, $R^6$ is $R^1$, —H, —OH, or a hydrolysable group, and w has a value of from 0 to 0.8, x has a value of from 0 to 0.6, y has a value of from 0 to 0.99, z has a value of from 0 to 0.35, the sum of y+z is 0.2 to 0.99, and the sum of w+x is 0.01 to 0.80, with the proviso that silicone resin ($A^1$) has an average of at least two silicon-bonded hydrogen atoms, or at least two silicon-bonded hydroxy groups, or at least two silicon-bonded hydrolysable groups per molecule;
($B^1$) is a cross-linking agent having the formula $R^7_qSiX_{4-q}$, wherein $R^7$ is $C_1$ to $C_8$ hydrocarbyl group or $C_1$ to $C_8$ halogen-substituted hydrocarbyl group, X is a hydrolysable group, and q is 0 or 1; and
($C^1$) is a condensation catalyst selected from tin(II) and tin (IV) compounds;
or
(III) a free radical cured silicone resin composition which is a cured product of a silicone composition comprising:
($A^2$) a free radical curable silicone resin having the formula

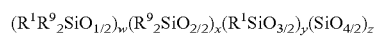

wherein $R^1$ is a $C_1$ to $C_{10}$ hydrocarbyl group or a $C_1$ to $C_{10}$ halogen-substituted hydrocarbyl group, both free of aliphatic unsaturation, $R^9$ is $R^1$, alkenyl, or alkynyl,
w has a value of from 0 to 0.8, x has a value of from 0 to 0.6, y has a value of from 0 to 0.99, z has a value of from 0 to 0.35, the sum of y+z is 0.2 to 0.99, and the sum of w+x is 0.01 to 0.80, with the proviso that silicone resin ($A^2$) has an average of at least two silicon-alkenyl groups or at least two silicon-bonded alkynyl groups per molecule;
($B^2$) a crosslinking agent which is an unsaturated compound having a molecular weight of less than 500 selected from (i) at least one organosilicon compound having at least one silicon-bonded alkenyl group per molecule, (ii) at least one organic compound having at least one aliphatic carbon-carbon double bond per molecule, or (iii) mixtures comprising (i) and (ii); and
($C^2$) a free radical photoinitiator or an organic peroxide,
a second glass substrate in contact with coating layer (ii) and optionally at least one additional glass substrate having coating layer (ii) applied thereon in contact with the second glass substrate and with the proviso that coating layer (ii) is sandwiched in between the second glass substrate and any additional glass substrates.

7. An article of manufacture according to claim 6, wherein coating layer (ii) is present on both sides of each glass substrate.

8. An article of manufacture according to claim 6, wherein the coating layer (ii) is the hydrosilylation cured silicone resin composition (I) and wherein
(A) is $(ViMe_2SiO_{1/2})_w(PhSiO_{3/2})_y$, $(ViMe_2SiO_{1/2})_w(MeSiO_{3/2})_{y1}(PhSiO_{3/2})_{y2}$, $(ViMe_2SiO_{1/2})_w(PhSiO_{3/2})_y(SiO_{4/2})_z$, or $(Vi_2MeSiO_{1/2})_{w1}(ViMe_2SiO_{1/2})_{w2}(PhSiO_{3/2})_y$
wherein Me is methyl, Vi is vinyl, Ph is phenyl; w, w1, and w2 each has a value of 0.05 to 0.3; y, y1, and y2 each has a value of 0.5 to 0.8; and z has a value of 0 to 0.15; and
(B) is an organohydrogensilane having the formula:

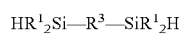

wherein $R^1$ is a $C_1$ to $C_{10}$ hydrocarbyl group or a $C_1$ to $C_{10}$ halogen-substituted hydrocarbyl group, both free of aliphatic unsaturation, and $R^3$ is a hydrocarbylene group free of aliphatic unsaturation.

9. An article of manufacture according to claim 6, wherein the coating layer (ii) is the condensation cured silicone resin composition (II) and wherein
($A^1$) is a silicone resin having the formula:

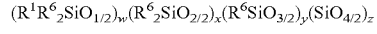

wherein $R^1$ is a $C_1$ to $C_{10}$ hydrocarbyl group or a $C_1$ to $C_{10}$ halogen-substituted hydrocarbyl group, both free of aliphatic unsaturation, $R^6$ is $R^1$, —H, —OH, or a hydrolysable group, and w has a value of from 0 to 0.8, x has a value of from 0 to 0.6, y has a value of from 0 to 0.99, z has a value of from 0 to 0.35, the sum of y+z is 0.2 to 0.99, and the sum of w+x is 0.01 to 0.80, with the proviso that silicone resin ($A^1$) has an average of at least two silicon-bonded hydrogen atoms, or at least two silicon-bonded hydroxy groups, or at least two silicon-bonded hydrolysable groups per molecule;

($B^1$) is a cross-linking agent having the formula $R^7_q SiX_{4-q}$, wherein $R^7$ is $C_1$ to $C_8$ hydrocarbyl group or $C_1$ to $C_8$ halogen-substituted hydrocarbyl group, X is a hydrolysable group, and q is 0 or 1; and ($C^1$) is a condensation catalyst selected from tin (II) and tin(IV) compounds.

10. An article of manufacture according to claim 6, wherein the coating layer (ii) is the free radical cured silicone resin composition (III) and wherein ($A^2$) is $(Vi_2MeSiO_{1/2})_w(PhSiO_{3/2})_y$, $(ViMe_2SiO_{1/2})_w(PhSiO_{3/2})_y$, $(ViMe_2SiO_{1/2})_w(MeSiO_{3/2})_{y1}(PhSiO_{3/2})_{y2}$, $(ViMe_2SiO_{1/2})_w(PhSiO_{3/2})_y(SiO_{4/2})_z$, and $(Vi_2MeSiO_{1/2})_{w1}(ViMe_2SiO_{1/2})_{w2}(PhSiO_{3/2})_y$, wherein w1 and w2 each has a value of 0.05 to 0.3, and wherein y1 and y2 each has a value of 0.5 to 0.8.

* * * * *